United States Patent
Kim et al.

(10) Patent No.: US 11,671,704 B2
(45) Date of Patent: Jun. 6, 2023

(54) ELECTRONIC DEVICE INCLUDING A PLURALITY OF IMAGE SENSORS AND METHOD FOR THEREOF

(71) Applicant: Samsung Electronics Co., Ltd., Suwon-si (KR)

(72) Inventors: Kwanho Kim, Suwon-si (KR); Dohan Kim, Suwon-si (KR); Changwoo Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 30 days.

(21) Appl. No.: 17/521,346

(22) Filed: Nov. 8, 2021

(65) Prior Publication Data

US 2022/0159185 A1 May 19, 2022

Related U.S. Application Data

(63) Continuation of application No. PCT/KR2021/015662, filed on Nov. 2, 2021.

(30) Foreign Application Priority Data

Nov. 13, 2020 (KR) .......................... 10-2020-0152216

(51) Int. Cl.
*H04N 23/667* (2023.01)
*H04N 23/45* (2023.01)
(Continued)

(52) U.S. Cl.
CPC ........... *H04N 23/667* (2023.01); *H04N 23/45* (2023.01); *H04N 23/632* (2023.01); *H04N 23/69* (2023.01); *H04N 23/57* (2023.01)

(58) Field of Classification Search
CPC ...... H04N 5/2258; H04N 5/247; H04N 23/45; H04N 23/90; H04N 5/23296; H04N 23/69;
(Continued)

(56) References Cited

U.S. PATENT DOCUMENTS 9,185,291 B1 11/2015 Shabtay et al.
2012/0044372 A1 2/2012 Cote et al.
(Continued)

FOREIGN PATENT DOCUMENTS

EP 3694201 A1 * 8/2020 ........ H04M 1/72439
JP 2005-086219 A 3/2005
(Continued)

OTHER PUBLICATIONS

International Search Report dated Feb. 10, 2022, issued in International Application No. PCT/KR2021/015662.

*Primary Examiner* — Paul M Berardesca
(74) *Attorney, Agent, or Firm* — Jefferson IP Law, LLP

(57) ABSTRACT

Various embodiments may provide an electronic device including a memory, a first image sensor circuit, a second image sensor circuit, and at least one processor, operatively connected to the first image sensor circuit and the second image sensor circuit, configured to control the first image sensor circuit to output first frame data associated with a first field of view at a first frame rate from a first time point to a second time point, and store the first frame data in the memory, control the second image sensor circuit to output second frame data associated with a second field of view at the first frame rate from a third time point after the second time point to a fourth time point, and store the second frame data in the memory, obtain the stored first frame data and the stored second frame data from the memory.

20 Claims, 24 Drawing Sheets

(51) Int. Cl.
*H04N 23/63* (2023.01)
*H04N 23/69* (2023.01)
*H04N 23/57* (2023.01)

(58) Field of Classification Search
CPC .. H04N 5/23245; H04N 5/343; H04N 23/667; H04N 25/42; H04N 5/23293–232945; H04N 23/63–635
See application file for complete search history.

(56) References Cited

U.S. PATENT DOCUMENTS

| | | | |
|---|---|---|---|
| 2018/0070009 A1* | 3/2018 | Baek | H04N 23/69 |
| 2018/0227489 A1* | 8/2018 | Ho | H04N 23/667 |
| 2018/0343382 A1 | 11/2018 | Cohen et al. | |
| 2018/0359392 A1 | 12/2018 | Cohen et al. | |
| 2019/0068893 A1* | 2/2019 | Kim | H04N 23/698 |
| 2019/0130550 A1 | 5/2019 | Mitsubayashi et al. | |
| 2019/0141307 A1 | 5/2019 | Youn et al. | |
| 2019/0289201 A1* | 9/2019 | Nishimura | G06F 3/04845 |
| 2019/0306382 A1 | 10/2019 | Kim et al. | |
| 2020/0077019 A1* | 3/2020 | Kim | H04N 23/667 |
| 2020/0099894 A1 | 3/2020 | Yun et al. | |
| 2020/0128181 A1 | 4/2020 | An | |
| 2020/0322530 A1 | 10/2020 | Choi et al. | |
| 2021/0084231 A1* | 3/2021 | Lee | H04N 23/62 |
| 2021/0360172 A1* | 11/2021 | Liu | G06T 3/0093 |
| 2022/0006922 A1* | 1/2022 | Bathija | H04N 23/61 |
| 2022/0201205 A1* | 6/2022 | Chen | H04N 5/772 |

FOREIGN PATENT DOCUMENTS

| | | |
|---|---|---|
| JP | 2014-216803 A | 11/2014 |
| KR | 10-2010-0132739 A | 12/2010 |
| KR | 10-2012-0096954 A | 8/2012 |
| KR | 10-2017-0088514 A | 8/2017 |
| KR | 10-2019-0010710 A | 1/2019 |
| KR | 10-2019-0051594 A | 5/2019 |
| KR | 10-2019-0075654 A | 7/2019 |
| KR | 10-2020-0034528 A | 3/2020 |
| KR | 10-2020-0043818 A | 4/2020 |
| KR | 10-2020-0117695 A | 10/2020 |

* cited by examiner

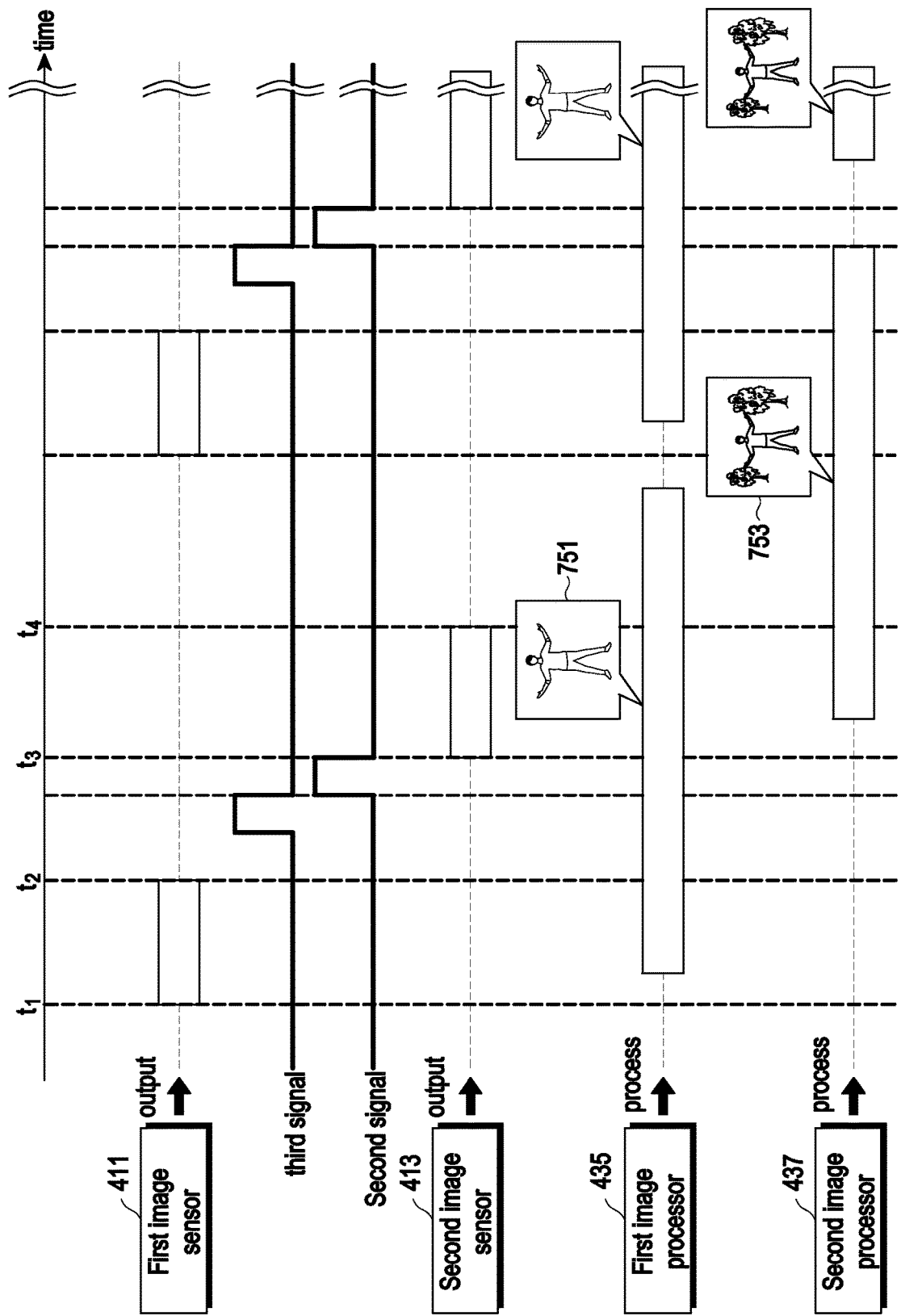

«ELECTRONIC DEVICE INCLUDING A PLURALITY OF IMAGE SENSORS AND METHOD FOR THEREOF»

CROSS-REFERENCE TO RELATED APPLICATIONS

This application is a continuation application, claiming priority under § 365(c), of an International application No. PCT/KR2021/015662, filed on Nov. 2, 2021, which is based on and claims the benefit of a Korean patent application number 10-2020-0152216, filed on Nov. 13, 2020, in the Korean Intellectual Property Office, the disclosure of which is incorporated by reference herein in its entirety.

BACKGROUND

1. Field

The disclosure relates to an electronic device including a plurality of image sensors and a method for operating the same.

2. Description of Related Art

Various kinds of electronic devices are widely used by consumers nowadays.

Electronic devices have a plurality of image sensors for capturing images with different fields of view, and the plurality of image sensors may image external objects and output pieces of images frame data with different fields of view. Electronic devices may use the pieces of images frame data with different fields of view so as to provide images with different fields of view or to generate images with different fields of view.

Recently, electronic devices are provided with an increasing number of image sensors, and image frame data is output from the image sensors through a large bandwidth. Therefore, there is a need for implementation of a technology for efficiently processing image frame data output from a plurality of image sensors.

The above information is presented as background information only to assist with an understanding of the disclosure. No determination has been made, and no assertion is made, as to whether any of the above might be applicable as prior art with regard to the disclosure.

An electronic device may include a plurality of image sensors for capturing images with different fields of view. At least some of the plurality of image sensors may be high-speed image sensors configured to output image frame data for a short period of time (for example, 1/960 sec). In order to efficiently process image frame data output from high-speed image sensors at a high speed (or at a high frame rate), the electronic device may temporarily store the image frame data in a memory (for example, a non-volatile memory). If image frame data output from high-speed image sensors for a short period of time are simultaneously stored in the memory, the bandwidth of data transmitted to the memory may increase abruptly, thereby placing a substantial burden of operating the electronic device for processing (for example, storing) image frame data. In addition, if an electronic device has a plurality of high-speed image sensors, an increasing burden may be placed on the electronic device in order to process image frame data output from the plurality of high-speed image sensors during image capture.

Various embodiments are to address at least the above-mentioned problems and/or disadvantages and to provide at least the advantages described below. Accordingly, according to various embodiments, an electronic device and a method for operating the same may conduct control such that time intervals in which a plurality of pieces of image frame data are output from high-speed image sensors do not overlap, thereby reducing the burden of operating the electronic device for processing the plurality of pieces of image frame data (for example, reducing the instantaneous bandwidth while image frame data is stored in the memory). In addition, according to various embodiments, an electronic device and a method for operating the same may conduct control such that, if a field of view for image capture is selected, frame image data output from an image sensor, which is different from the selected field of view, is not processed (for example, stored), thereby reducing the burden on the electronic device occurring during image capture.

Additional aspects will be set forth in part in the description which follows and, in part, will be apparent from various embodiments, or may be learned by various embodiments.

SUMMARY

According to various embodiments, there may be provided an electronic device including a memory, a first image sensor circuit, a second image sensor circuit, and at least one processor operatively connected to the first image sensor circuit and the second image sensor circuit, wherein the at least one processor is configured to control the first image sensor circuit to output first frame data associated with a first field of view at a first frame rate from a first time point to a second time point, and store the first frame data in the memory, control the second image sensor circuit to output second frame data associated with a second field of view at the first frame rate from a third time point after the second time point to a fourth time point, and store the second frame data in the memory, obtain the stored first frame data and the stored second frame data from the memory, display, based on the obtained first frame data, a first preview image associated with the first field of view and display, based on the obtained second frame data, a second preview image associated with the second field of view, and based on reception of an input for selecting the first preview image while displaying the first preview image and the second preview image, control the first image sensor circuit to output at least one piece of third frame data associated with the first field of view at a second frame rate faster than the first frame rate, and based on the at least one piece of third frame data, generate the first video associated with the first field of view.

According to various embodiments, there may be provided an operating method e including controlling the first image sensor circuit to output first frame data associated with a first field of view at a first frame rate from a first time point to a second time point, and storing the first frame data in the memory, controlling the second image sensor circuit to output second frame data associated with a second field of view at the first frame rate from a third time point after the second time point to a fourth time point, and storing the second frame data in the memory after storing the first frame data, obtaining the stored first frame data and the stored second frame data from the memory, displaying, based on the obtained first frame data, a first preview image associated with the first field of view and displaying, based on the obtained second frame data, a second preview image associated with the second field of view, and based on reception of an input for selecting the first preview image while displaying the first preview image and the second preview image, controlling the first image sensor circuit to output at least one piece of third frame data associated with the first field of view at a second frame rate faster than the first frame rate, and based on the at least one piece of third frame data, generating the first video associated with the first field of view.

According to various embodiments, there may be provided an electronic device including a memory, a first image sensor circuit, a second image sensor circuit, and at least one processor operatively connected to the first image sensor circuit and the second image sensor circuit, wherein the at least one processor is configured to control the first image sensor circuit to output at least one piece of first frame data at a first frame rate from a first time point to a second time point, obtain, from the first image sensor, a signal indicating a time point at which the outputting of the at least one pieces of first frame data is completed, and control, based on the obtained signal, the second image sensor circuit to output at least one piece of second frame data at the first frame rate from a third time point after the second time point to a fourth time point.

Technical solutions according to various embodiments are not limited to the above-described technical solutions, and other technical solutions not mentioned herein will be obviously understood from the specification and the accompanying drawings by those skilled in the art to which the disclosure pertains.

According to various embodiments, there may be provided an electronic device and a method for operating the same, which conduct control such that time intervals in which a plurality of pieces of image frame data are output from high-speed image sensors do not overlap, thereby reducing the burden of operating the electronic device for processing the plurality of pieces of image frame data (for example, reducing the instantaneous bandwidth while image frame data is stored in the memory).

In addition, according to various embodiments, there may be provided an electronic device and a method for operating the same, which conduct control such that, if a field of view for image capture is selected, frame image data output from an image sensor, which is different from the selected field of view, is not processed (for example, stored), thereby reducing the burden on the electronic device occurring during image capture.

Other aspects, advantages, and salient features of the disclosure will become apparent to those skilled in the art from the following various embodiments, which, taken in conjunction with the annexed drawings, discloses various embodiments.

BRIEF DESCRIPTION OF THE DRAWINGS

The above and other aspects, features, and advantages of various embodiments will be more apparent from the following description taken in conjunction with the accompanying drawings, in which:

FIG. 9B is a view for describing another example of an operation of controlling an output time point of frame data output from each of a plurality of image sensors of an electronic device according to various embodiments;

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
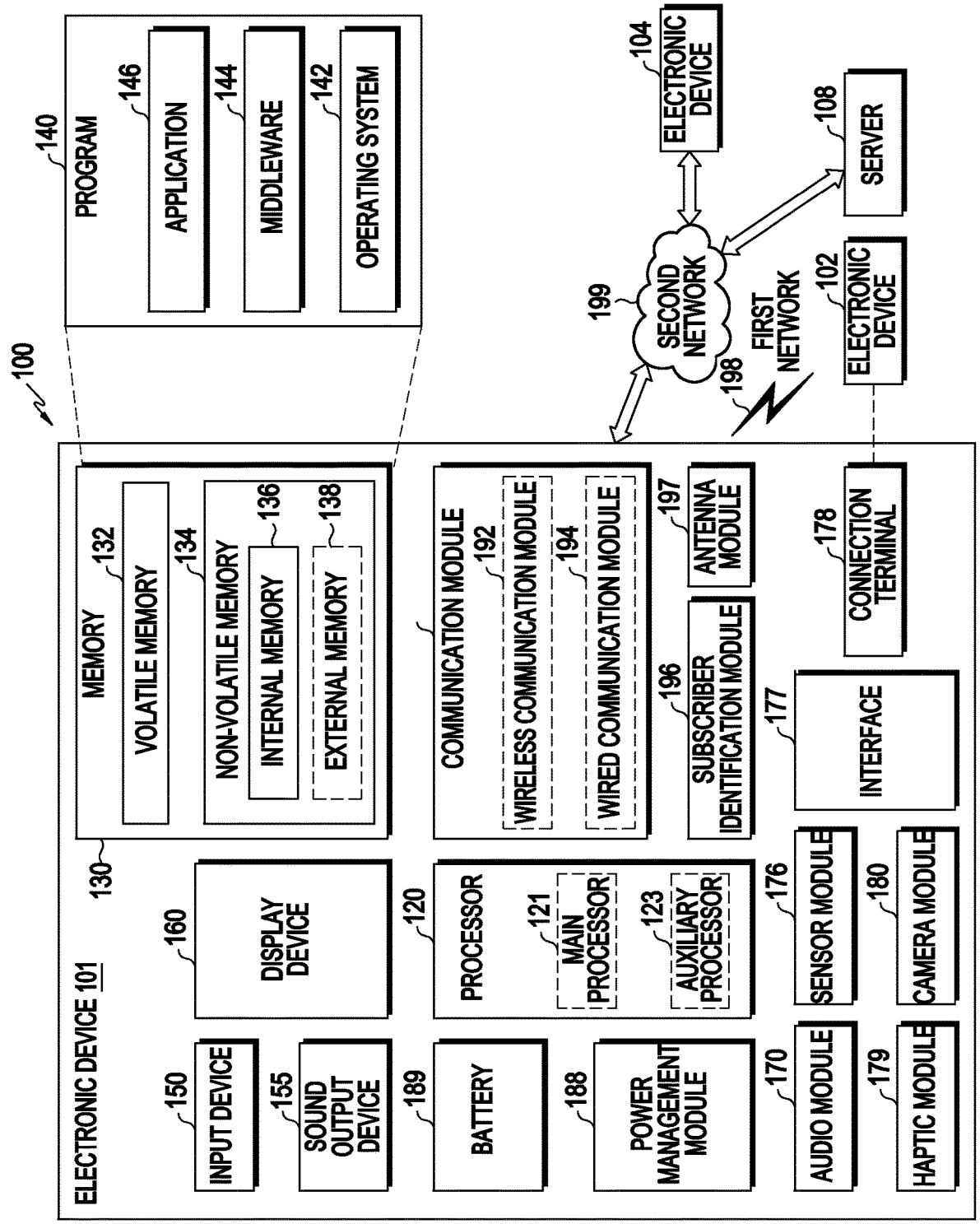
FIG. 1 is a block diagram of an electronic device in a network environment according to various embodiments.

FIG. 1 is a block diagram illustrating an electronic device in a network environment according to various embodiments.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., a smart home, a smart city, a smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
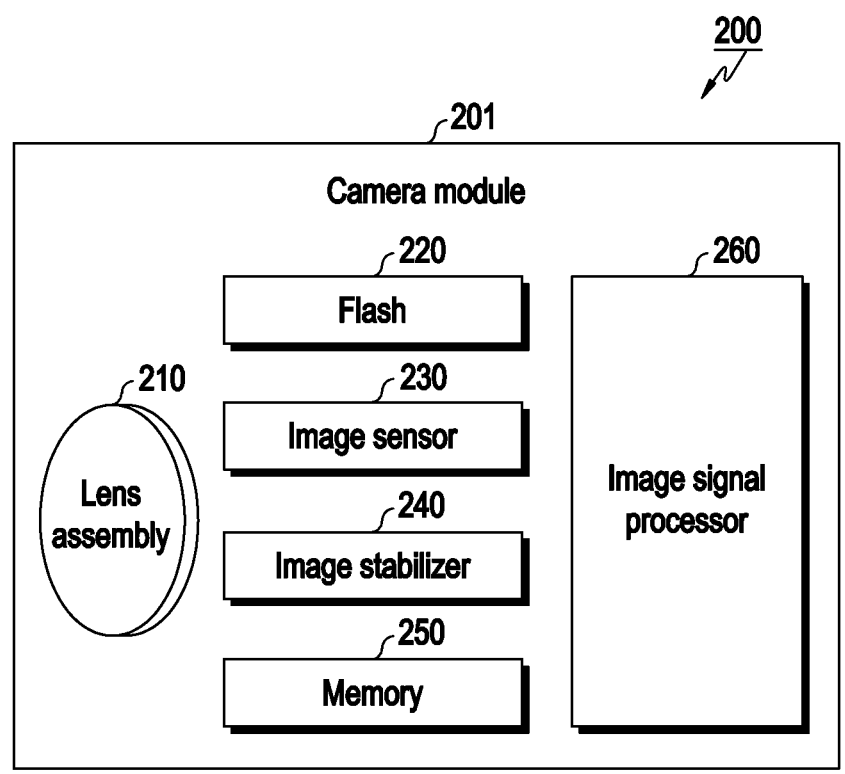
FIG. 2A is a block diagram illustrating a camera module according to various embodiments.

FIG. 2A is a block diagram 200 illustrating a camera module 201 (e.g., the camera module 180 in FIG. 1) according to various embodiments.

Referring to FIG. 2A, the camera module 201 may include a lens assembly 210, a flash 220, an image sensor 230, an image stabilizer 240, a memory 250 (e.g., a buffer memory), or the image signal processor 260. The lens assembly 210 may collect light emitted from a subject of which an image is to be captured. The lens assembly 210 may include one or more lenses. According to various embodiments, the camera module 201 may include a plurality of lens assemblies 210. The camera module 201 may be formed as, for example, a dual camera, a 360-degree camera, or a spherical camera. Some of the plurality of lens assemblies 210 may have the same lens properties (e.g., field of view, focal length, autofocus, f-numbers, or optical zoom), or at least one lens assembly may have one or more lens properties that are different from the lens properties of another lens assembly. The lens assembly 210 may include, for example, a wide-angle lens or a telephoto lens.

The flash 220 may emit light which is to be used to reinforce light emitted or reflected from a subject. According to various embodiments, the flash 220 may include one or more light-emitting diodes (e.g., a red-green-blue (RGB) LED, a white LED, infrared LED, or an ultraviolet LED), or a xenon lamp. The image sensor 230 may convert light, which has been emitted or reflected from a subject and transferred through lens assembly 210, into an electrical signal, thereby acquiring an image corresponding to the subject. According to various embodiments, the image sensor 230 may include, for example, one image sensor selected among image sensors, such as an RGB sensor, a black and white (BW) sensor, an IR sensor, or a UV sensor, having different properties, a plurality of image sensors having the same properties, or a plurality of image sensors having different properties. Each image sensor included in the image sensor 230 may be implemented using, for example, a charged coupled device (CCD) sensor or a complementary metal oxide semiconductor (CMOS) sensor.

In response to movement of the camera module 201 or an electronic device 101 including the same, the image stabilizer 240 may move at least one lens included in the lens assembly 210 or the image sensor 230 in a specific direction, or may control operation characteristics of the image sensor 230 (e.g., may adjust read-out timing). This at least partially compensates for a negative effect of the movement on a captured image. According to various embodiments, the image stabilizer 240 may sense the movement of the camera module 201 or the electronic device 101 by using a gyro sensor (not shown) or an acceleration sensor (not shown) disposed inside or outside the camera module 201. According to various embodiments, the image stabilizer 240 may be implemented as, for example, an optical image stabilizer. The memory 250 may at least temporarily store at least a part of an image acquired through the image sensor 230 for a following image processing work. For example, when image acquisition according to a shutter is delayed or when a plurality of images are acquired at a high speed, an acquired original image (e.g., a Bayer-patterned image or a high-quality image) may be stored in the memory 250, and a copy image (e.g., a low-quality image) corresponding thereto may be previewed through a display device 160. Thereafter, if a designated condition is satisfied (e.g., a user input or a system command), the at least part of the original image stored in the memory 250 may be acquired and processed by, for example, the image signal processor 260. According to various embodiments, the memory 250 may be formed as at least a part of the memory 250 or as a separate memory operated independently thereof.

The image signal processor 260 may perform one or more types of image processing for an image acquired through the image sensor 230 or an image stored in the memory 250. The one or more types of image processing may include, for example, depth map generation, three-dimensional modeling, panorama generation, feature point extraction, image synthesis, or image compensation (e.g., noise reduction, resolution adjustment, brightness adjustment, blurring, sharpening, or softening. Additionally or alternatively, the image signal processor 260 may perform control (e.g., exposure time control, read-out timing control, or the like) for at least one (e.g., the image sensor 230) of elements included in the camera module 201. The image processed by the image signal processor 260 may be stored in the memory 250 again for an additional process, or may be provided to an element (e.g., the memory 250, the display device 160, an electronic device 202, an electronic device 204, or a server 208) outside the camera module 201. According to various embodiments, the image signal processor 260 may be formed as at least a part of the processor 120, or may be formed as a separate processor operated independently of the processor 120. When the image signal processor 260 is formed as a processor separate from the processor 120, at least one image processed by the image signal processor 260 may be displayed through the display device 160 as it is or after additional image processing by the processor 120.

According to various embodiments, the electronic device 101 may include a plurality of camera modules 201 having different properties or functions. For example, at least one of the plurality of camera modules 201 may be a wide-angle camera, and at least another camera module may be a telephoto camera. Similarly, at least one of the plurality of camera modules 201 may be a front camera, and at least another thereof may be a rear camera.

Figure 2B:
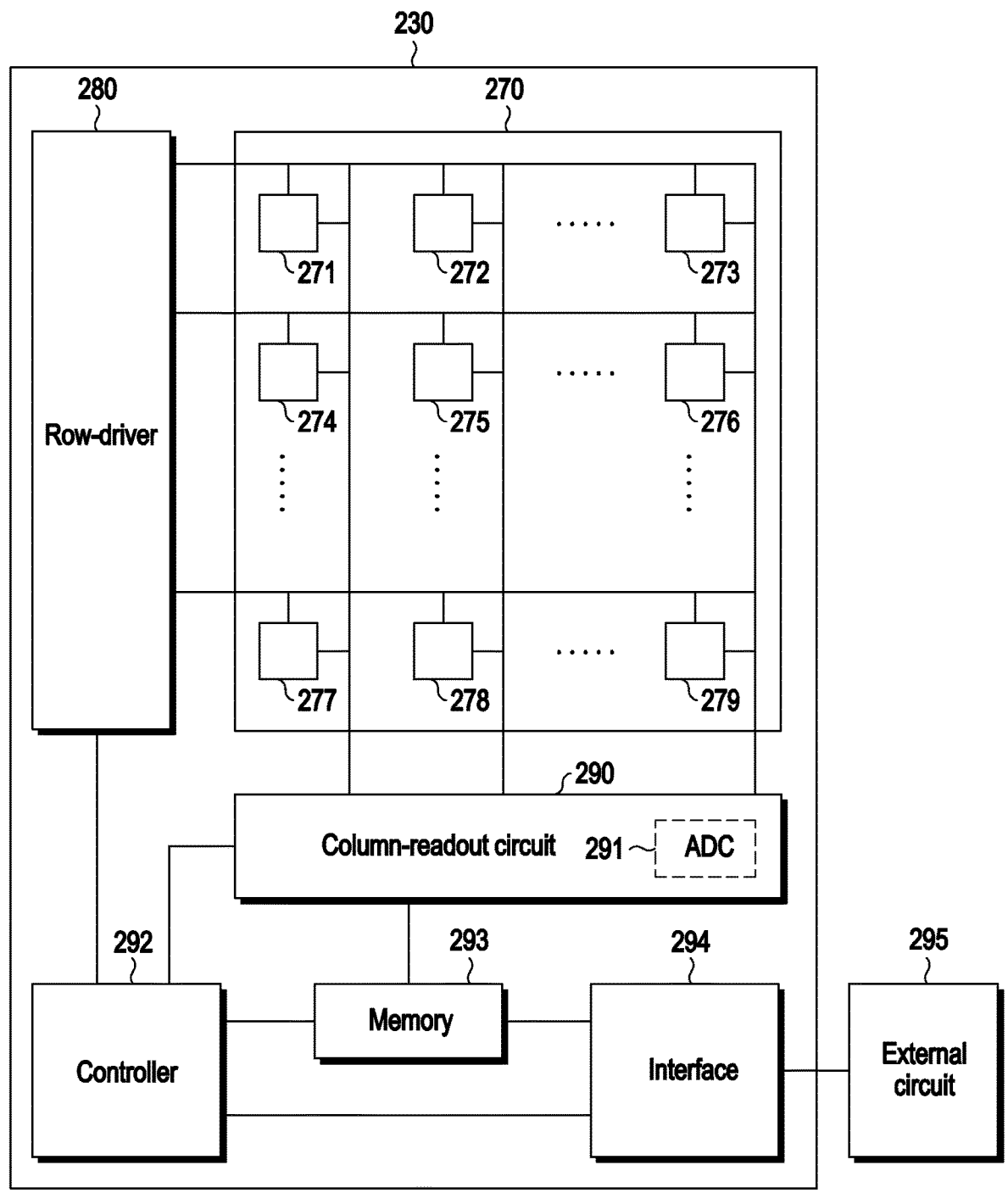
FIG. 2B is a block diagram for describing the structure of an image sensor according to various embodiments.

FIG. 2B is a block diagram for describing the structure of an image sensor according to various embodiments.

According to an embodiment, the image sensor 230 may be an element of a camera module (e.g., reference numeral 180 or 201) included in the electronic device 101.

Referring to FIG. 2B, the image sensor 230 according to various embodiments may include at least one among a pixel array 270, a row-driver 280, a column-readout circuit 290, a controller 292, a memory 293, or an interface 294.

The pixel array 270 may include a plurality of pixels 271 to 279. For example, the pixel array 270 may have a structure in which the plurality of pixels 271 to 279 are arrayed in an M*N matrix shape (M and N are natural numbers). The pixel array 270, in which the plurality of pixels 271 to 279 are arrayed in a two-dimensional shape of M*N, may have M rows and N columns. The pixel array 270 may include a plurality of light-sensing elements, such as photo diodes or pinned photo diodes. The pixel array 270 may sense light by using the plurality of light-sensing elements, and may convert the sensed light into an analog electrical signal to generate a video signal.

The row-driver 280 may drive the pixel array 270 in a unit of rows. For example, the row-driver 280 may output, to the pixel array 270, a transmission control signal for controlling a transmission transistor of the plurality of pixels 271 to 279 included in the pixel array 270, a reset control signal for controlling a reset transistor, or a selection control signal for controlling a selection transistor. The row-driver 280 may determine a row to be read out.

The column-readout circuit 290 may receive the analog electrical signal generated by the pixel array 270. For example, the column-readout circuit 290 may receive an analog electrical signal from a column line selected from among a plurality of columns constituting the pixel array 270. The column-readout circuit 290 may include an analog digital converter (hereinafter, ADC) 291 capable of converting the analog electrical signal received from the selected column line into pixel data (or a digital signal) and outputting the pixel data. An operation in which the column-readout circuit 290 receives an analog electrical signal from the pixel array 270, converts the received analog electrical signal into a pixel data by using the ADC 291, and outputs the pixel data, may be called a "readout". The column-readout circuit 290 and the ADC 291 may determine a column to be read out.

According to an embodiment, the column-readout circuit 290 of the image sensor 230, which supports a high-speed capturing image (or imaging, or shooting) function, may include a plurality of ADCs 291. Each of the plurality of ADCs 291 may be connected in parallel to a plurality of photo diodes included in the pixel array 270, and may quickly convert analog electrical signals simultaneously received from a plurality of photo diodes into pixel data based on a parallel structure. The column-readout circuit 290 of the image sensor 230, which supports a high-speed capturing function may perform a readout at a high-speed frame rate (e.g., 960 frames per second (fps)). For example, performing the readout at 960 fps may imply that an operation of receiving an analog electrical signal from the pixel array 270, converting the received analog electrical signal into pixel data by using the ADC 291, and outputting the pixel data is performed once per $1/960$ seconds. For example, performing the readout at 960 fps may imply outputting 960 image frames per second.

The controller 292 may acquire an image data, based on the pixel data received from the column-readout circuit 290. The controller 292 may output the image frame through the interface 294 to the external circuit 295. According to an embodiment, the controller 292 may generate a transmission control signal for controlling a transmission transistor of the plurality of pixels 271 to 279, a reset control signal for controlling a reset transistor, or a selection control signal for controlling a selection transistor, and may provide the generated signal to the row-driver 280. Further, the controller 292 may generate a selection control signal for selecting at least one column line from among a plurality of column lines constituting the pixel array 270, and may provide the generated signal to the column-readout circuit 290. For example, based on the selection control signal provided from the controller 292, the column-readout circuit 290 may enable some of the plurality of column lines, and may disable the remaining column lines. Further, the controller 292 may be implemented as a type of block or module, or a processor (e.g., reference numeral 120) including a central processing unit (CPU), an application processor (AP), or the like. When the controller 292 is implemented as a block, the controller 292 may include, for example, a subtractor configured to detect the difference between images, a comparator configured to compare images with each other, or the like. In various embodiments, the controller 292 may downsize images which have been read out, and may compare the plurality of downsized images with each other to sense the difference between the images.

The memory 293 may include a volatile memory and/or a nonvolatile memory. The memory 293 is a storage device provided in the image sensor 230, and may include a buffer memory. According to an embodiment, the memory 293 may temporarily store a digital signal that has been output from the column-readout circuit 290 or the controller 292. For example, the memory 293 may include at least one image frame acquired based on light received in the pixel array 270. Further, the memory 293 may store at least one digital signal received from the external circuit 295 through the interface 294.

According to an embodiment, the memory 293 may store at least one image frame that has been read out from the column-readout circuit 290 at an Nth frame rate (e.g., 960 fps) or an $M^{th}$ frame rate (e.g., 120 fps), and may transfer the at least one stored image frame to the external circuit 295 (e.g., IPS, a processor, a communication circuit, or an external server) through the interface 294. For example, the memory 293 may store at least one image frame that has been read out from the column-readout circuit 290 once per $1/960$ seconds or once per $1/120$ seconds, and may transfer the at least one stored image frame to the external circuit 295 through the interface 294. There is no limit to a speed at which the image frame is transferred to the external circuit 295. In various embodiments, the electronic device 101 may immediately transfer the image frame, which has been read out, to the external circuit 295 through the interface 294 without storing the image frame in the memory 293.

The controller 292 may store only some of a plurality of Nth image frames, read out at the Nth frame rate (e.g., 960 fps) through the column-readout circuit 290, in the memory 293, thereby obtaining substantially the same effect as an effect of acquiring a plurality of Mth image frames read out at the Mth frame rate (e.g., 120 fps). For example, the controller 292 may store, in the memory 293, only one of eight image frames that are read out for $8/960$ seconds at 960 fps. If only image frames selected in a ratio of 1:8 from among a plurality of image frames read out at 960 fps are stored in the memory 293, the image frames stored in the memory 293 may be substantially identical to image frames that have been read out at 120 fps through the column-readout circuit 290. For example, when a moving image including only image frames acquired at a period of $1/120$ seconds is defined as a "120 fps moving image", a moving image including only image frames selected in a ratio of 1:8 from among a plurality of image frames read out at 960 fps may be defined as a 120 fps moving image. Further, a moving image including only image frames read out at 120 fps through the column-readout circuit 290 may be defined as a 120 fps moving image.

The interface 294 may include, for example, the interface 177 or the communication module 190. The interface 294 may connect an element of the image sensor 230, for example, the controller 292 or the memory 293, to the external circuit 295 in a wired or wireless manner. For example, the interface 294 may transfer at least one image frame stored in the memory 293 of the image sensor 230 to the external circuit 295, for example, a memory (e.g., reference numeral 130) of the electronic device 101 (e.g., reference numeral 101). Further, a control signal from the external circuit 295, for example, a processor (e.g., reference numeral 120) of the electronic device 101 (e.g., reference numeral 101) may be transferred to the controller 292 of the image sensor 230.

According to an embodiment, the image sensor 230 may communicate with the external circuit 295 through the interface 294 by using, for example, a serial communication method. For example, the memory 293 of the image sensor 230 may communicate with a processor (e.g., reference numeral 120) of the electronic device 101 (e.g., reference numeral 101) through an inter-integrated circuit (I2C) method.

According to another embodiment, the image sensor 230 may be connected to the external circuit 295 through the interface 294, for example, an interface defined under the mobile industry processor interface (MIPI) standard. For example, the memory 293 of the image sensor 230 may communicate with a processor (e.g., reference numeral 120) of the electronic device 101 (e.g., reference numeral 101) through an interface defined under the MIPI standard. The interface 294, for example an interface defined under the MIPI standard, may transfer pixel data corresponding to an image frame stored in the memory 293 to the external circuit 295 at a period of $1/120$ seconds.

While image frames stored in the memory 293 are transferred to the external circuit 295 once per $1/20$ seconds through the interface 294 having an output speed of 240 fps, at least some of image frames read out in real time through the column-readout circuit 290 may be transferred as preview images to the external circuit 295 once per $1/120$ seconds. The processor 120 included in the external circuit 295 may display all or some of the image frames, output as preview images in the image sensor 230, through a display at 30 fps or 60 fps.

All or some of the above-described elements 270 to 295 may be included in the image sensor 230 as necessary, and each element may be provided as a single element or a plurality of elements. Further, the frame rates 120 fps, 240 fps, and 960 fps used in the above embodiment may vary depending on the configuration of an electronic device or the performance of an interface.

Figure 2C:
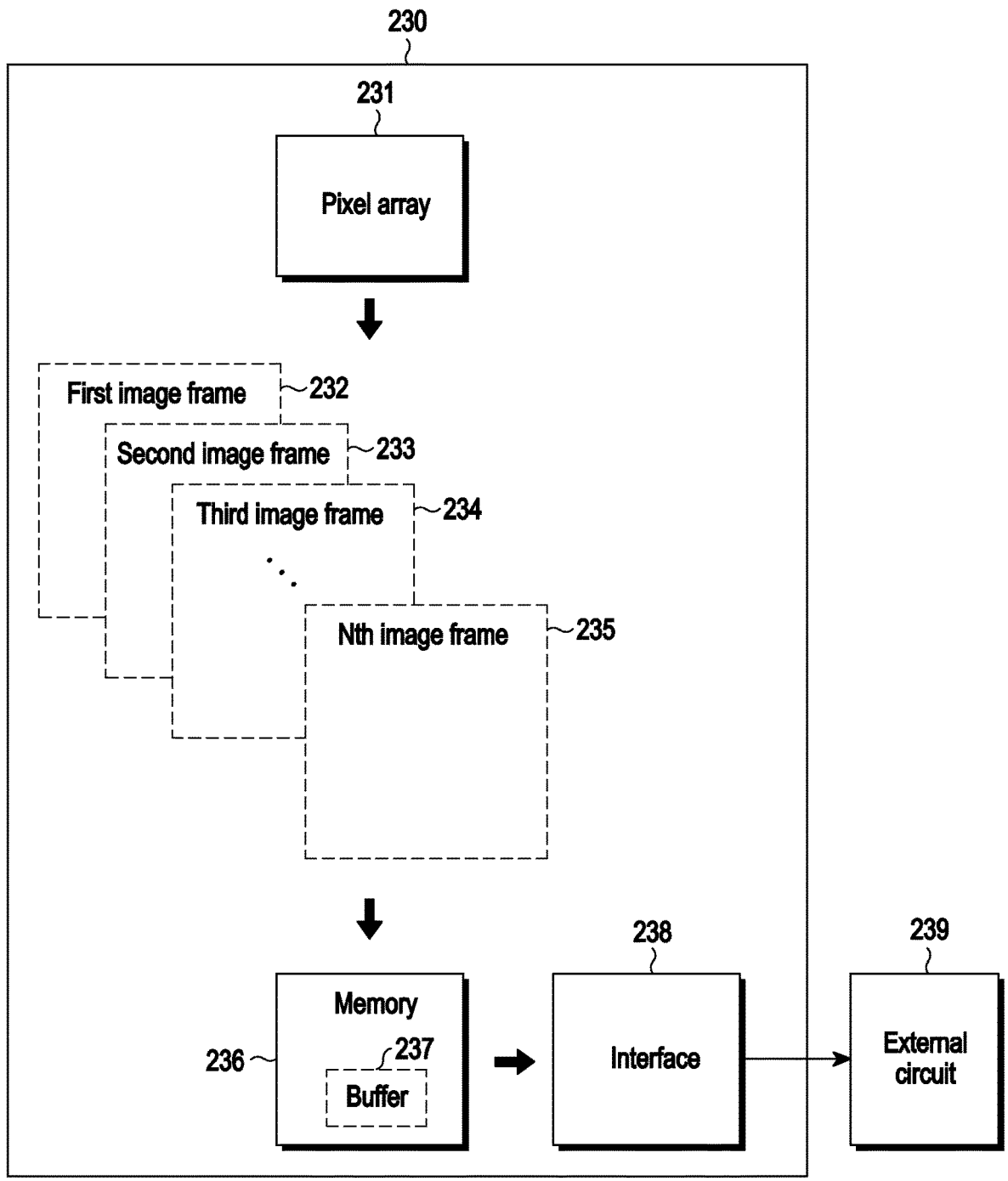
FIG. 2C is a block diagram illustrating a process of acquiring an image frame through an image sensor according to various embodiments.

FIG. 2C is a block diagram illustrating a process of acquiring an image frame through an image sensor according to various embodiments. The image sensor 230 may be an element of a camera module (e.g., reference numeral 180 or 201) included in the electronic device 101 (e.g., reference numeral 101).

Referring to FIG. 2C, the image sensor 230 may include at least one among a pixel array 231, a memory 236, and an interface 238. The image sensor 230 may include all or a part of the image sensor 230 illustrated in FIG. 2B.

The pixel array 231 of the image sensor 230 may output an electrical signal corresponding to light received from the outside. For example, the pixel array 231 may include a plurality of pixels (e.g., the plurality of pixels 271 to 279 in FIG. 2B) formed as photo diodes. The photo diodes may receive light, and may generate analog electrical signals corresponding to the received light. The analog electrical signals generated from the plurality of photo diodes constituting the plurality of pixels may be converted to a plurality of types of pixel data through a column-readout circuit (e.g., reference numeral 290). The plurality of types of pixel data may imply pixel values corresponding to the plurality of pixels, respectively. A set of a plurality of types of pixel data acquired at a specific time point may constitute at least one image frame.

According to an embodiment, the pixel array 231 of the image sensor 230 may output a plurality of image frames 232 to 235 at a preset readout speed. For example, if the readout speed is set to 960 fps, the image sensor 230 may read out 960 image frames per second based on light received by the pixel array 231. The electronic device 101 according to various embodiments may detect a high-speed capturing image (or imaging, or shooting) event while capturing is performed in a normal mode, in which case the electronic device 101 may read out an image at 120 fps and then read out the image at 960 fps.

The plurality of image frames 232 to 235, which have been read out, may be stored in the memory 236 included in the image sensor 230. According to an embodiment, the memory 236 of the image sensor 230 may include a buffer memory 237. For example, some of the plurality of image frames 232 to 235 read out at 960 fps may be stored in the buffer memory 237. A designated number of image frames, among a plurality of image frames which are continuously read out, may be stored in the buffer memory 237. A processor (e.g., reference numeral 120 or the controller 292) may repeatedly perform an operation of deleting an oldest stored image frame among image frames stored in the buffer memory 237 and storing a latest acquired image frame.

At least one image frame stored in the memory 236 of the image sensor 230 may be transferred to an external circuit 239 through the interface 238 (e.g., reference numeral 294). For example, the processor (e.g., reference numeral 120 or the controller 292) may control the interface 238 such that the at least one image frame stored in the memory 236 can be transferred to the external circuit 239.

In various embodiments, the image sensor 230 may not include the buffer memory 237, and thus the image frames 232, 233, 234, and 235 may be directly transferred from the pixel array 231 to the external circuit 239 through the interface 238.

Hereinafter, a description will be made of an example of an operation of the electronic device 101 performed using a plurality of image sensors (e.g., a first image sensor 301 and a second image sensor 302 (or a plurality of image sensor circuits). The description of the image sensor 230, made with reference to FIGS. 2A to 2C, may be applied to the plurality of image sensors (e.g., the first image sensor 301 and the second image sensor 302) described below, and thus a redundant description thereof will be omitted.

Figure 3:
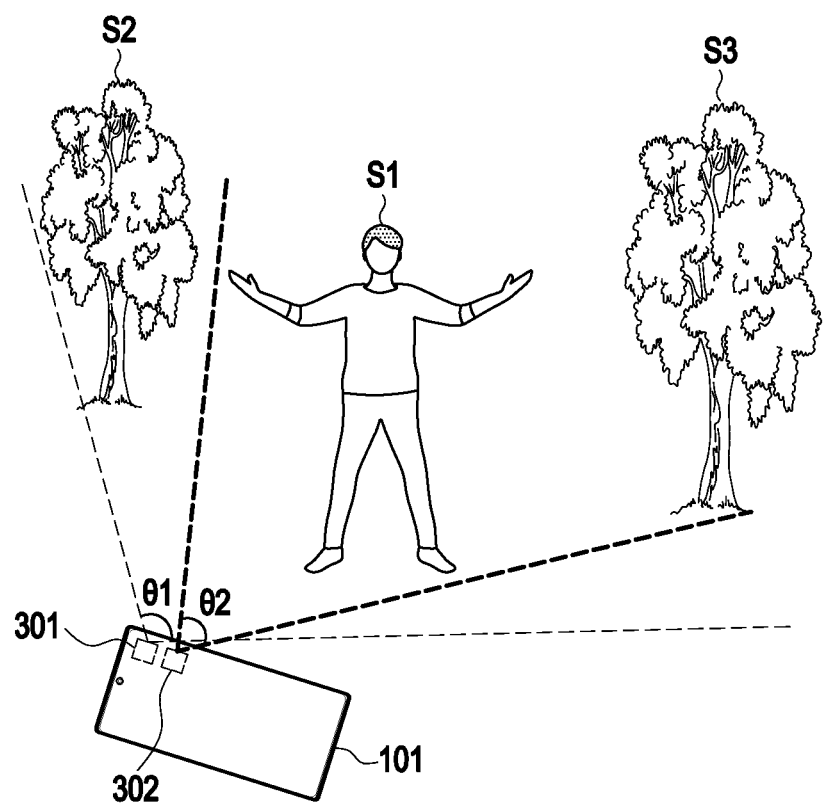
FIG. 3 is a view for describing an example of an operation of an electronic device using a plurality of image sensors according to various embodiments.
Figure 3:
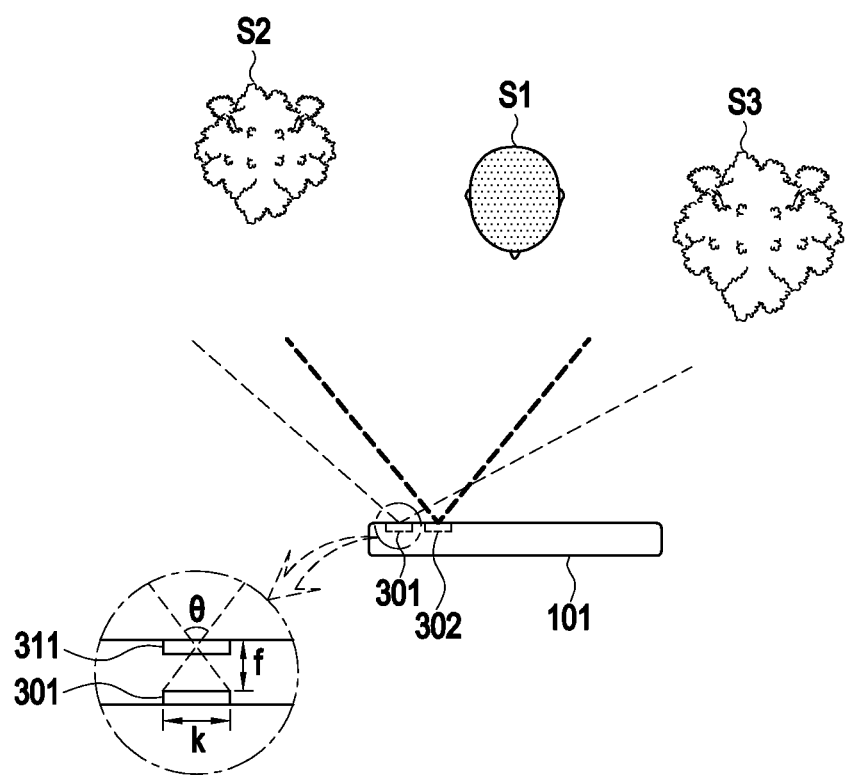

FIG. 3 is a view for describing an example of an operation of an electronic device 101 using a plurality of image sensors (e.g., the first image sensor 301 and the second image sensor 302) according to various embodiments.

Referring to FIG. 3, the electronic device 101 may include a plurality of image sensors (e.g., the first image sensor 301 and the second image sensor 302). According to an embodiment, without being limited to the number (e.g., two) of the plurality of image sensors (e.g., the first image sensor 301 and the second image sensor 302) illustrated in FIG. 3, the electronic device 101 may include more (e.g., three or more) image sensors. The plurality of image sensors (e.g., the first image sensor 301 and the second image sensor 302) may have visual characteristics. For example, as illustrated in FIG. 3, the plurality of image sensors (e.g., the first image sensor 301 and the second image sensor 302) may have different fields of view (e.g., θ1 and θ2). Alternatively, without being limited to the above description, the plurality of image sensors (e.g., the first image sensor 301 and the second image sensor 302) may have the same field of view. The field of view may imply an angle at which capturing image (or imaging, or shooting) can be performed by an image sensor. As illustrated in FIG. 3, the electronic device 101 may include a lens 311 arranged to be spaced a predetermined distance (e.g., a focal length) apart from the front surface of the image sensor (e.g., the first image sensor 301), and the field of view (θ) of the image sensor may be determined based on the distance (e.g., the focal length (f)) between the lens 311 and the image sensor (e.g., the first image sensor 301) and the width (k) of the image sensor. For example, the field of view (θ) may be determined by Equation 1 below.

$$\text{Field of view} = \alpha \cdot 2 \cdot \tan^{-1}\left(\frac{k}{2f}\right), \quad \text{Equation 1}$$

$\alpha$ = various factor values, $f$ = focal length, $K$ = the length of the front surface of image sensor In an example, the field of view (θ) may include a super wide angle of 114° to 94°, a wide angle, a normal lens angle of 84° to 63°, a telephoto angle of 28° to 8°, and a super telephoto angle of 6° to 3°.

Without being limited to the above description, the plurality of image sensors (e.g., the first image sensor 301 and the second image sensor 302) may be different from or identical to each other in various types of properties (e.g., depth or image quality (or the number of pixels)).

According to various embodiments, the electronic device 101 may simultaneously perform capturing image (or imaging, or shooting) by using the plurality of image sensors (e.g., the first image sensor 301 and the second image sensor 302). For example, as illustrated in FIG. 3, the electronic device 101 may drive the plurality of image sensors (e.g., the first image sensor 301 and the second image sensor 302) to image a plurality of external objects (e.g., S1, S2, S3) positioned in front of the plurality of image sensors (e.g., the first image sensor 301 and the second image sensor 302), and may acquire, from the plurality of image sensors (e.g., the first image sensor 301 and the second image sensor 302), a plurality of pieces of image frame data (hereinafter, referred to as "frame data") associated with the plurality of external objects. The electronic device 101 may process the acquired a plurality of types of frame data to generate a plurality of images (e.g., frame images), and may display a preview image or generate a video, based on the plurality of generated images. For example, the electronic device 101 may acquire, from the plurality of image sensors (e.g., the first image sensor 301 and the second image sensor 302), frame data having fields of view (e.g., θ1 and θ2) associated with the plurality of image sensors (e.g., the first image sensor 301 and the second image sensor 302), and, based on the acquired frame data, may display preview images of the fields of view, or may generate a video. A description will be made later of operations in which the electronic device 101 acquires a frame image, and based on the frame image, generates and/or displays a preview image and generates a video.

According to various embodiments, each of the plurality of image sensors included in the electronic device 101 may be a high-speed image sensor. For example, the high-speed image sensor may be an image sensor capable of outputting frame data (which is described below) at a high speed. In an example, the high-speed image sensor may output one piece of frame data for 1/960 seconds, and when the frame data is output at a period of 1/960 seconds, a frame rate may be 960 fps. Without being limited to the above description, at least one of the plurality of image sensors may include a non-high-speed image sensor. The highest frame rate of the non-high-speed image sensor may be configured to be lower than the highest frame rate of the high-speed image sensor. For example, when outputting frame data at the highest frame rate, the high-speed image sensor may output the frame data at a period that is shorter than a preview period, and when outputting frame data at the highest frame rate, the non-high-speed image sensor may output the frame data at a period that corresponds to (e.g., is identical or similar to) the preview period.

Hereinafter, a description will be made of examples of the configuration of the electronic device 101 including a plurality of image sensors (e.g., a first image sensor 411 and a second image sensor 413).

Figure 4A:
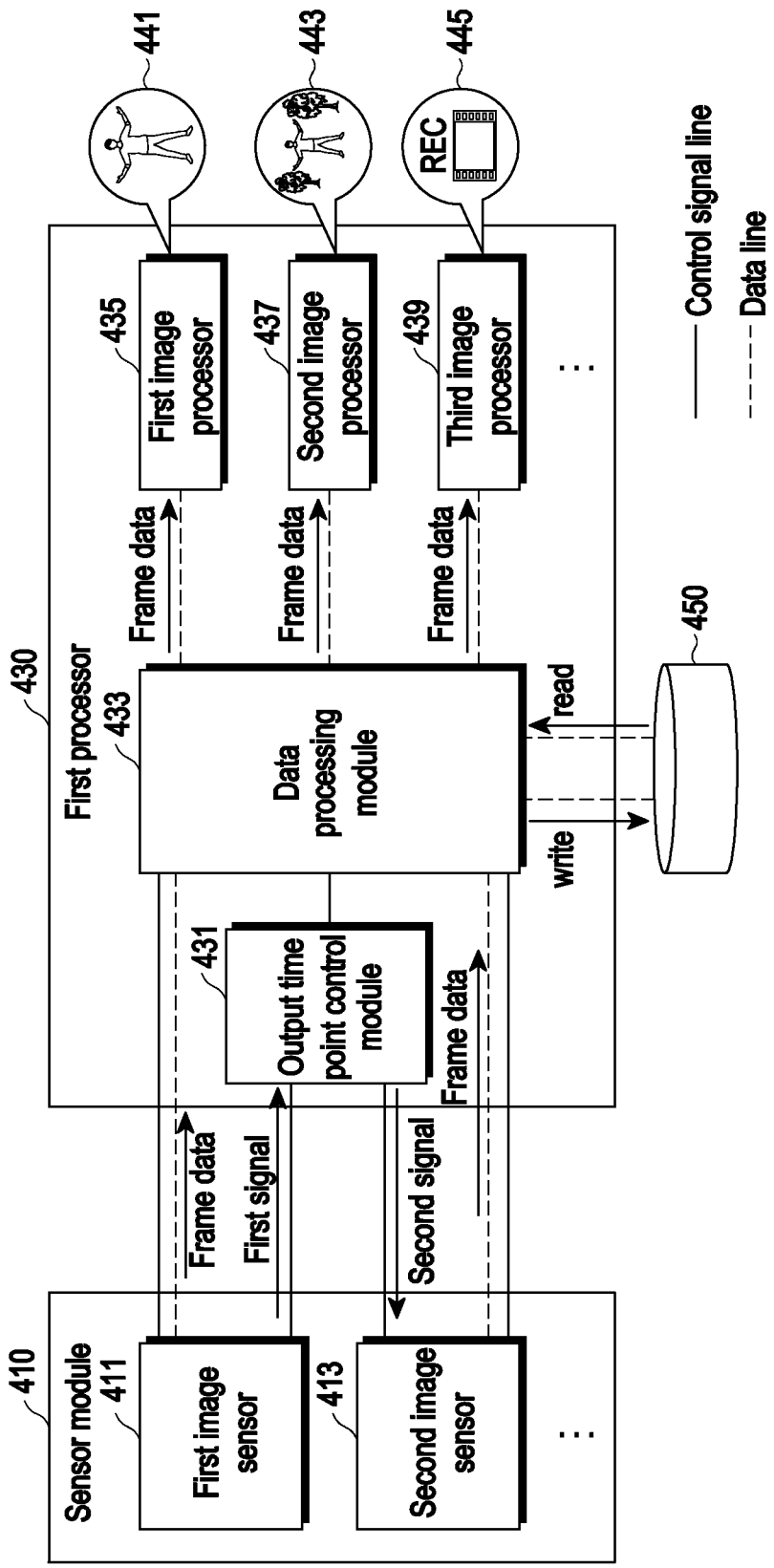
FIG. 4A illustrates an example of the configuration of an electronic device including a plurality of image sensors according to various embodiments.

FIG. 4A illustrates an example of the configuration of the electronic device 101 including a plurality of image sensors (e.g., the first image sensor 411 and the second image sensor 413) according to various embodiments. According to various embodiments, without being limited to the devices illustrated in FIG. 4A, the electronic device 101 may be implemented so as to include more elements or fewer elements. For example, the electronic device 101 may be implemented so as to further include the elements described with reference to FIGS. 1, 2A, and 2B.

Figure 4B:
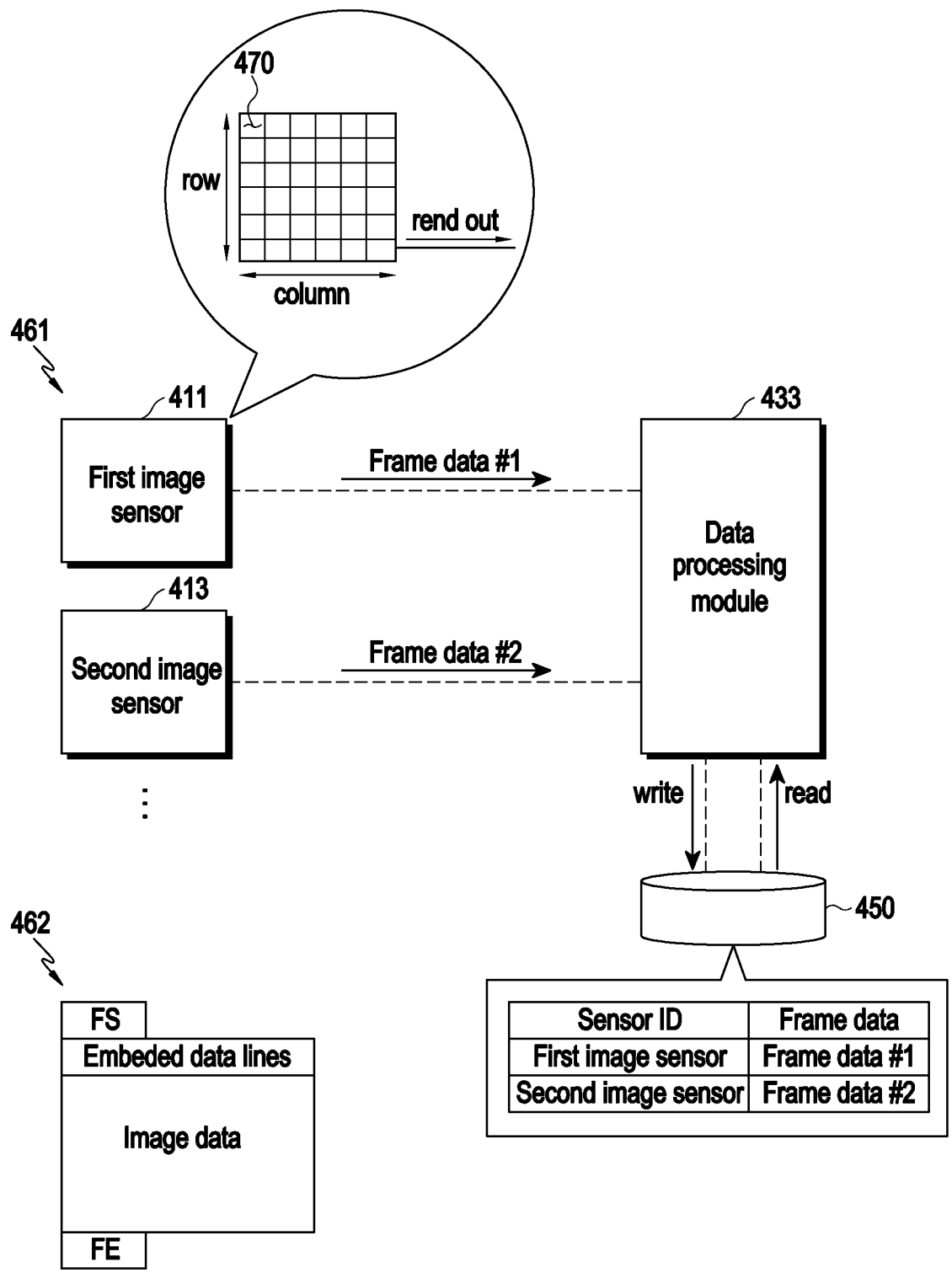
FIG. 4B is a view for describing an example of storing frame data output from a plurality of image sensors of an electronic device according to various embodiments.

FIG. 4B is a view for describing an example of an operation of storing frame data output from a plurality of image sensors (e.g., the first image sensor 411 and the second image sensor 413) of the electronic device 101 according to various embodiments.

According to various embodiments, the electronic device 101 may include: a sensor module 410 including the plurality of image sensors (e.g., the first image sensor 411 and the second image sensor 413), an output time point control module 431, a data processing module 433, a memory 450, and a plurality of image processors (e.g., a first image processor 435, a second image processor 437, and a third image processor 439). According to various embodiments, modules (e.g., the output time point control module 431 and the data processing module 433) included in a first processor 430 may be implemented in the form of software that can be executed by the first processor 430. For example, the modules may be implemented in the form of applications, programs, computer codes or instructions, routines, or processes, and, when being executed by the first processor 430, the modules may cause the first processor 430 to perform functions and/or operations associated with the modules (e.g., the output time point control module 431 and the data processing module 433). Further, according to various embodiments, the modules may be implemented in the form of hardware. For example, the modules may be implemented in the form of hardware such as a processor (reference numeral 120 in FIG. 1), and may be configured to perform functions and/or operations associated with the modules.

According to various embodiments, as illustrated in FIG. 4A, elements included in the electronic device 101 may be connected to each other through a data line for transmission and/or reception of data and a control signal line for transmission and/or reception of a control signal. Without being limited to the illustration of FIG. 4A, other elements (e.g., at least one electric element, such as a buffer, a resistor, an inductor, or a capacitor) may be further electrically connected to each other between the data line and the control signal line. For example, the data line may include mobile industry processor interface (MIPI)-based M-PHY, D-PHY (e.g., a camera serial interface (CSI) or a display serial interface (DSI)), or C-PHY, and the control signal line may include an I2C interface. Further, without being limited to the description, the data line and the control signal line may not be separately provided, but a single transmission/reception line for transmission and/or reception of data and/or a control signal may be provided.

Hereinafter, the elements included in the electronic device 101 will be described. First, the sensor module 410 and the plurality of image sensors (e.g., the first image sensor 411 and the second image sensor 413) will be described.

According to various embodiments, the sensor module may include a plurality of sensors. For example, the sensor module may be a camera module (e.g., the camera module 201 in FIG. 2A) including image sensors. In another example, without being limited to the description, the sensor module may be a sensor hub configured to control various types of sensors (e.g., a touch sensor, a gyro sensor, a motion sensor) other than the image sensors.

According to various embodiments, each of the plurality of image sensors (e.g., the first image sensor 411 and the second image sensor 413) may output frame data. For example, each of the plurality of image sensors (e.g., the first image sensor 411 and the second image sensor 413) may include elements (e.g., photoelectric elements 470) configured to output electrical signals (e.g., current and voltage) during reception of light. When each of the plurality of image sensors (e.g., the first image sensor 411 and the second image sensor 413) receives (e.g., is exposed to) light having a specific field of view and incident through a lens during a capturing image (or imaging, or shooting) operation, the elements 470 included in the plurality of image sensors (e.g., the first image sensor 411 and the second image sensor 413) may output electrical signals, based on the reception of light. Each of the plurality of image sensors (e.g., the first image sensor 411 and the second image sensor 413) may output the electrical signals in a unit of frames. For example, as illustrated in reference numeral 461 of FIG. 4B, each of the plurality of image sensors (e.g., the first image sensor 411 and the second image sensor 413) may include the photoelectric elements 470 for pixels arrayed in a plurality of rows and columns, and may sequentially read out the photoelectric elements 470 arranged for the plurality of rows and columns, or may simultaneously read out all of the photoelectric elements 470 arranged for the plurality of rows and columns. Each of the image sensors (the first image sensor 411 and the second image sensor 413) may output an electrical signal (e.g., Frame data #1 or Frame data #2) of one frame unit (e.g., a plurality of rows and a plurality of columns) according to the readout operation. The electrical signal of one frame unit, output for the plurality of rows and the plurality of columns, may be defined as image frame data (hereinafter, referred to as "frame data"). The time required to read out one piece of frame data by the image sensor may be defined as a readout time, and the number of frame data transmitted by the image sensor for 1 second based on the readout operation may be defined as a frame rate (fps). In one example, one image sensor is a high-speed image sensor and is capable of outputting one piece of frame data for $1/960$ seconds, and when one piece of frame data is output at a period of $1/960$ seconds, the frame rate may be 960 fps. Meanwhile, an image sensor, which is not a high-speed image sensor, is defined as a non-high-speed image sensor, and the non-high-speed image sensor may be an image sensor which can output frame data at a frame rate lower than 960 fps. The frame rate of the image sensor may be adjusted based on a frame data output period, and a description thereof will be made later. The plurality of image sensors (e.g., the first image sensor 411 and the second image sensor 413) may be implemented as image sensors having a widely known structure, such as a charge coupled device (CCD) structure or a complementary metal oxide semiconductor (CMOS) structure, and thus a description thereof will be omitted. Further, the image sensors are identical to those described with reference to FIGS. 2A to 2C, and thus a redundant description thereof will be omitted. Frame data output from the plurality of image sensors (e.g., the first image sensor 411 and the second image sensor 413) may be transmitted to the first processor 430 through a plurality of data lines that connect the plurality of image sensors (e.g., the first image sensor 411 and the second image sensor 413) to the first processor 430.

According to various embodiments, the plurality of image sensors (e.g., the first image sensor 411 and the second image sensor 413) may output frame data at different speeds depending on the mode of the electronic device 101. For example, the plurality of image sensors may adjust, based on the mode of the electronic device 101 (e.g., a capturing image (or imaging, or shooting) mode implemented in an application for capturing image (or imaging, or shooting) (e.g., a camera application)), a period in which a readout operation is performed, thereby changing a frame rate. The mode of the electronic device 101 may include a preview mode and a video recording mode. The preview mode may be defined as a mode in which the electronic device displays a preview image, and a video recording mode may be defined as a mode in which the electronic device 101 generates a video. For example, when an image sensor is a high-speed image sensor, the image sensor may perform a readout operation for $1/960$ seconds to output frame data. When the mode of the electronic device 101 is a preview mode, the image sensor may perform a readout operation in a period of $1/60$ seconds for $1/960$ seconds to output frame data at a frame rate of 60 fps. Further, when the mode of the electronic device 101 is a video recording mode and the image sensor is selected to generate a video, the image sensor may perform (e.g., continuously perform) a readout operation at a period of $1/960$ seconds for $1/960$ seconds to output frame data at a frame rate of 960 fps. Further, when the image sensor is not selected for video generation while the mode of the electronic device 101 is a video recording mode, the image sensor may not perform a readout operation (e.g., may not output frame data), or may maintain a period (e.g., 1/60 seconds) in which a readout operation is performed in a preview mode. An operation of the electronic device 101 according to a video recording mode will be described later with reference to FIGS. 11 to 14. The image sensors 411 and 413 may receive a control signal for starting a readout operation from the first processor 430 (e.g., the data processing module 433) through the control signal lines, and may identify, based on the signal, the above-described mode of the electronic device 101 or information indicating whether the image sensors have been selected for the above-described video generation. For example, a signal transferred from the first processor 430 to each image sensor may include at least one of the above-described mode of the electronic device 101 or the information indicating whether the image sensors have been selected for the above-described video generation. The readout operation performance period and the frame rate are not limited to the above description, and may be adjusted to have various values by a user's configuration or automatically by the electronic device 101. As illustrated above, the electronic device 101 can adjust the frame rate of a high-speed image sensor based on the purposes of use of frame data (e.g., preview image displaying or video generation), and thus an operation charge of the electronic device 101 can be reduced.

According to various embodiments, the plurality of image sensors (e.g., the first image sensor 411 and the second image sensor 413) may output frame data (e.g., Frame data #1, Frame data #2) in a structure as illustrated in reference numeral 462 of FIG. 4B. For example, the frame data (e.g., Frame data #1, Frame data #2) may include data (frame start, FS) indicating a start of the frame data, embedded data, image data, and data (frame end, FE) indicating an end of the frame data. The embedded data may include frame data identification information (e.g., a Frame ID), and the identification information may include first identification information (e.g., an ID number) indicting that the frame data is frame data output at a low speed (e.g., 60 fps) in a preview mode, second identification information (e.g., an ID number) indicating that the frame data is frame data output at a high speed (e.g., 960 fps) in a video recording mode and used for video generation, or third identification information (e.g., an ID number) indicating that the frame data is frame data output at a high speed in the video recording mode and used for preview image generation. The first processor 430 (e.g., the data processing module 433), which will be described later, as illustrated in reference numeral 461 of FIG. 4B, may identify, based on the identification information included in the frame data (e.g., Frame data #1, Frame data #2), image sensors corresponding to the frame data (e.g., Frame data #1, Frame data #2) and may store (write) the identification information in the memory 450.

Hereinafter, elements included in the first processor 430 will be described. The first processor 430 may be an application processor (AP) or a central processing unit (CPU). Further, the first processor 430 may be implemented as the processor illustrated in FIG. 1, and thus a redundant description thereof will be omitted.

First, the output time point control module 431 included in the first processor 430 will be described.

According to various embodiments, the output time point control module 431 may control an output time point of frame data of the plurality of image sensors (e.g., the first image sensor 411 and the second image sensor 413). For example, the output time point control module 431 may adjust a start time point of readout operations of the image sensors to control an output time point of frame data output from the image sensors. In an example, the output time point control module 431 may transmit, at a particular time point, a control signal for starting (or causing) readout operations of the image sensors so as to cause the image sensors to output frame data from the particular time point. In another example, the output time point control module 431 may control an output time point of frame data accumulated by performance of readout operation of the image sensors. In an example, the image sensors may include an element (e.g., a capacitor) for accumulating frame data according to performance of readout operations. The output time point control module 431 may transmit, at a particular time point, a control signal for starting (or causing) output of frame data accumulated according to performance of readout operations to the image sensors so as to cause the image sensors to output the accumulated frame data from the particular time point.

According to various embodiments, the output time point control module 431 may control an output time point of frame data output from each of the plurality of image sensors (e.g., the first image sensor 411 and the second image sensor 413) such that time intervals, during which frame data is output from the plurality of image sensors (e.g., the first image sensor 411 and the second image sensor 413), do not overlap each other. For example, the output time point control module 431 may determine an output end time point of frame data of one image sensor (e.g., the first image sensor 411), and may perform control such that another image sensor outputs frame data from a time point after the output end time point. The output time point control module 431 may receive a signal (e.g., a first signal) indicating an end time point of outputting of frame data from one (e.g., the first image sensor 411) of the plurality of image sensors (e.g., the first image sensor 411 and the second image sensor 413), and may control, based on the received signal, an output time point of frame data of another image sensor (e.g., the second image sensor 413) (e.g., a time point at which the second image sensor 413 receives a second signal) such that the other image sensor outputs the frame data from a time point after the end time point. An operation of the output time point control module 431 will be described later with reference to FIGS. 6, 7, 8, 9A, and 9B.

Hereinafter, the data processing module 433 will be described.

According to various embodiments, the data processing module 433 may acquire and process frame data output from each of the plurality of image sensors (e.g., the first image sensor 411 and the second image sensor 413). For example, the data processing module 433 may store (write) the acquired frame data in the memory 450 described later. For example, as illustrated in reference numeral 461 of FIG. 4B, the data processing module 433 may identify, based on identification information included in frame data, an image sensor corresponding to the identification information, and may store (e.g., write) the frame data in the memory 450 together with the identified image sensor. In an example, the data processing module 433 may identify, based on identification information included in received frame data, that the frame data is frame data output at a low speed in a preview mode, and may identify an image sensor which outputs the frame data at a low speed in the preview mode. The data processing module 433 may store (e.g., write) the frame data in the memory 450 such that the frame data is associated with the identified image sensor. In another example, the data processing module 433 may identify a data line through which frame data is received, and may identify an image sensor connected to the identified data line, thereby storing (e.g., write) the frame data in the memory 450 together with the identified image sensor. Alternatively, without being limited to the description, the data processing module 433 may store, in the memory 450, frame data and identification information of the frame data, rather than an image sensor associated with the frame data.

According to various embodiments, the data processing module 433 may acquire (read) frame data stored in the memory 450, and may transfer the acquired frame data to an image processor for processing the same. As illustrated later, frame data to be processed may be preconfigured for each of the plurality of image processors. The data processing module 433 may identify identification information or an image sensor associated with frame data stored in the memory 450, and may transfer the frame data to an image processor corresponding to the identified image sensor or identification information, among the plurality of image processors (e.g., the first image processor 435, the second image processor 437, and the third image processor 439), such that the image processor processes the frame data (e.g., generates a preview image or generates a video).

Hereinafter, the plurality of image processors (e.g., the first image processor 435, the second image processor 437, and the third image processor 439) will be described.

According to various embodiments, the plurality of image processors (e.g., the first image processor 435, the second image processor 437, and the third image processor 439) may process frame data. Each of the plurality of image processors (e.g., the first image processor 435, the second image processor 437, and the third image processor 439) may acquire, from the data processing module 433, frame data output from a corresponding image sensor of the plurality of image sensors (e.g., the first image sensor 411 and the second image sensor 413), may process the acquired frame data to generate and/or acquire an image corresponding to the frame data, and may generate and/or acquire a video based on the generation of the image. For example, each of the image processors may convert one received piece of frame data (e.g., an electrical signal) into a color value for each pixel (e.g., a color model value, such as an RGB value, an HSV value, a YCbCr value, or an HIS value), and may generate one frame image based on the converted color value for each pixel and visual processing (e.g., color interpolation). An operation of generating an image by each of the image processors may be performed similarly or identically to the well-known technology, and thus more description thereof will be omitted. The first processor 430 may display, as a preview image, the one frame image generated from the image processor. In another example, as described above, each of the image processors may generate a plurality of pieces of frame data continuously (or sequentially) acquired at a high speed (e.g., 960 fps) as continuous (or sequential) frame images, and may generate a video including the generated frame images. At the time of video generation, each of the plurality of image processors (e.g., the first image processor 435, the second image processor 437, and the third image processor 439) may process, based on a video recording mode, a plurality of frame images to generate a video, a specific section of which is more slowly reproduced than other sections, and a description thereof will be made with reference to FIGS. 10 to 14.

According to various embodiments, the plurality of image processors (e.g., the first image processor 435, the second image processor 437, and the third image processor 439) may simultaneously perform the above-described types of processing (e.g., preview image generation or video generation). For example, the first image processor 435 may process frame data output from the first image sensor 411 to generate a preview image (e.g., reference numeral 441), while the second image processor 437 may process frame data output from the second image sensor 413 to generate a preview image (e.g., reference numeral 443). In another example, the first image processor 435 may process frame data output from the first image sensor 411 to generate a preview image (e.g., reference numeral 441), while the third image processor 439 may process frame data output from the first image sensor 411 to generate a video (e.g., reference numeral 445).

According to various embodiments, the plurality of image processors (e.g., the first image processor 435, the second image processor 437, and the third image processor 439) may process different types of frame data. For example, each of the plurality of image processors (e.g., the first image processor 435, the second image processor 437, and the third image processor 439) may be configured to process frame data output from a specific image sensor. In an example, the first image processor 435 may be configured to process frame data output from the first image sensor 411 to generate and/or acquire a preview image (e.g., reference numeral 441). The second image processor 437 may be configured to process frame data output from the second image sensor 413 to generate and/or acquire a preview image (e.g., reference numeral 443). The third image processor 439 may be configured to receive frame data output from the first image sensor 411 or the second image sensor 413 and process the received frame data to generate a video (e.g., reference numeral 445). Herein, the third image processor 439 may include an encoder configured to encode a video, and a decoder configured to decode the encoded video. The encoder and the decoder may be implemented as in the well-known technology, and thus a description thereof will be omitted. In another example, each of the plurality of image processors (e.g., the first image processor 435, the second image processor 437, and the third image processor 439) may be preconfigured to generate a preview image, or may generate and/or acquire a video. In an example, the first image processor 435 and the second image processor 437 may be configured to generate a preview image, and the third image processor 439 may be configured to generate a video. Therefore, as illustrated above, the first processor 430 (e.g., the data processing module 433) may transfer frame data received from each of the plurality of image sensors (e.g., the first image sensor 411 and the second image sensor 413) (e.g., a first image sensor and a second image sensor) to an image processor that corresponds to the received frame data (e.g., is configured to process the frame data). For example, the first processor 430 may identify identification information or an image sensor associated with one piece of frame data stored in the memory 450, and may transfer the one piece of frame data to an image processor configured to process frame data regarding the image sensor, or may transfer the one piece of frame data to an image processor configured to perform processing for a frame data output purpose (e.g., preview image generation) determined from the identification information.

Alternatively, a processing operation is not preconfigured for each of the plurality of image processors (e.g., the first image processor 435, the second image processor 437, and the third image processor 439) as described above, and an electronic device (e.g., the data processing module 433) may sequentially transfer frame data to the plurality of image processors (e.g., the first image processor 435, the second image processor 437, and the third image processor 439) such that the frame data is processed. For example, the electronic device (e.g., the data processing module 433) may transfer frame data acquired from one image sensor to one image processor so that the frame is processed (e.g., image generation or video generation is performed), and when there is a need to process a different type of frame data acquired from another image sensor, may transfer the different type of frame data to an image processor different from the one image processor such that the different type of frame data is processed (e.g., image generation or video generation is performed).

Hereinafter, a description will be made of another example of the configuration of the electronic device 101 according to various embodiments.

According to various embodiments, an element (e.g., the output time point control module 431) configured to control an output time point of frame data of a plurality of image sensors (e.g., the first image sensor 411 and the second image sensor 413) of the electronic device 101 is not limited to the illustration in FIG. 4A, and may be implemented in various elements other than the first processor 430.

Figure 5A:
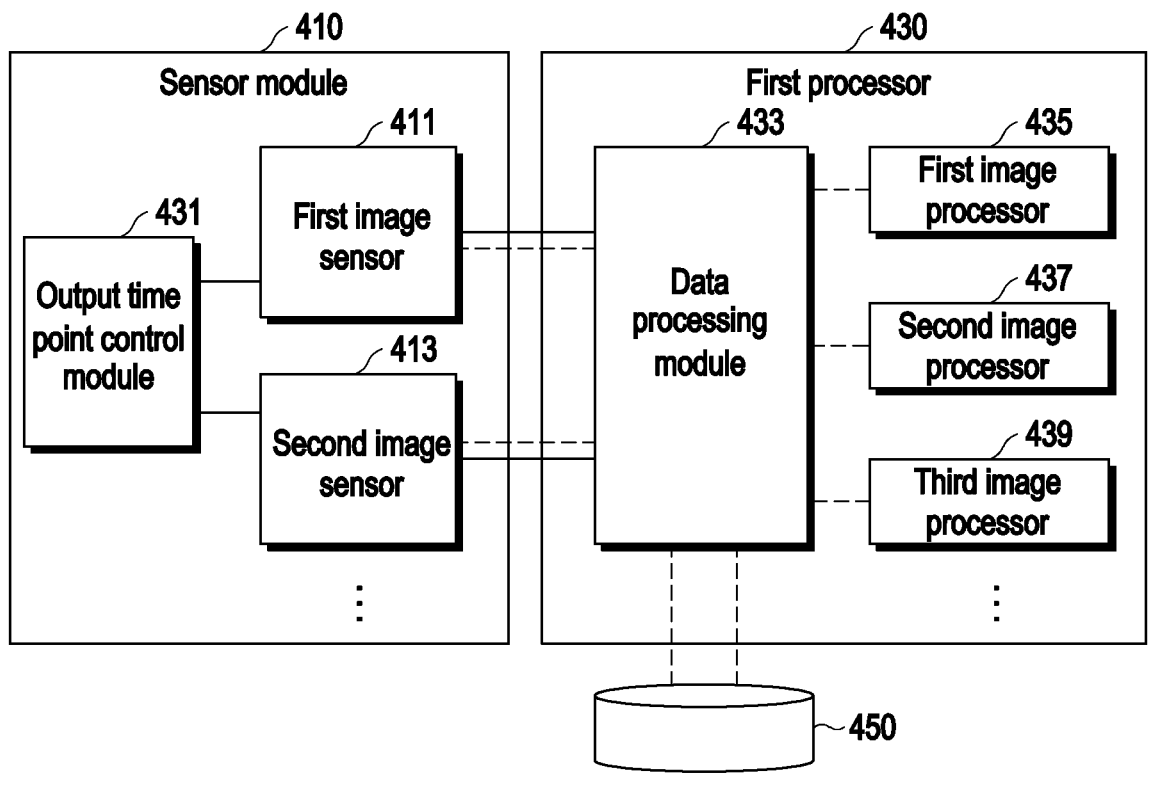
FIG. 5A illustrates another example of the configuration of an electronic device according to various embodiments.
Figure 5B:
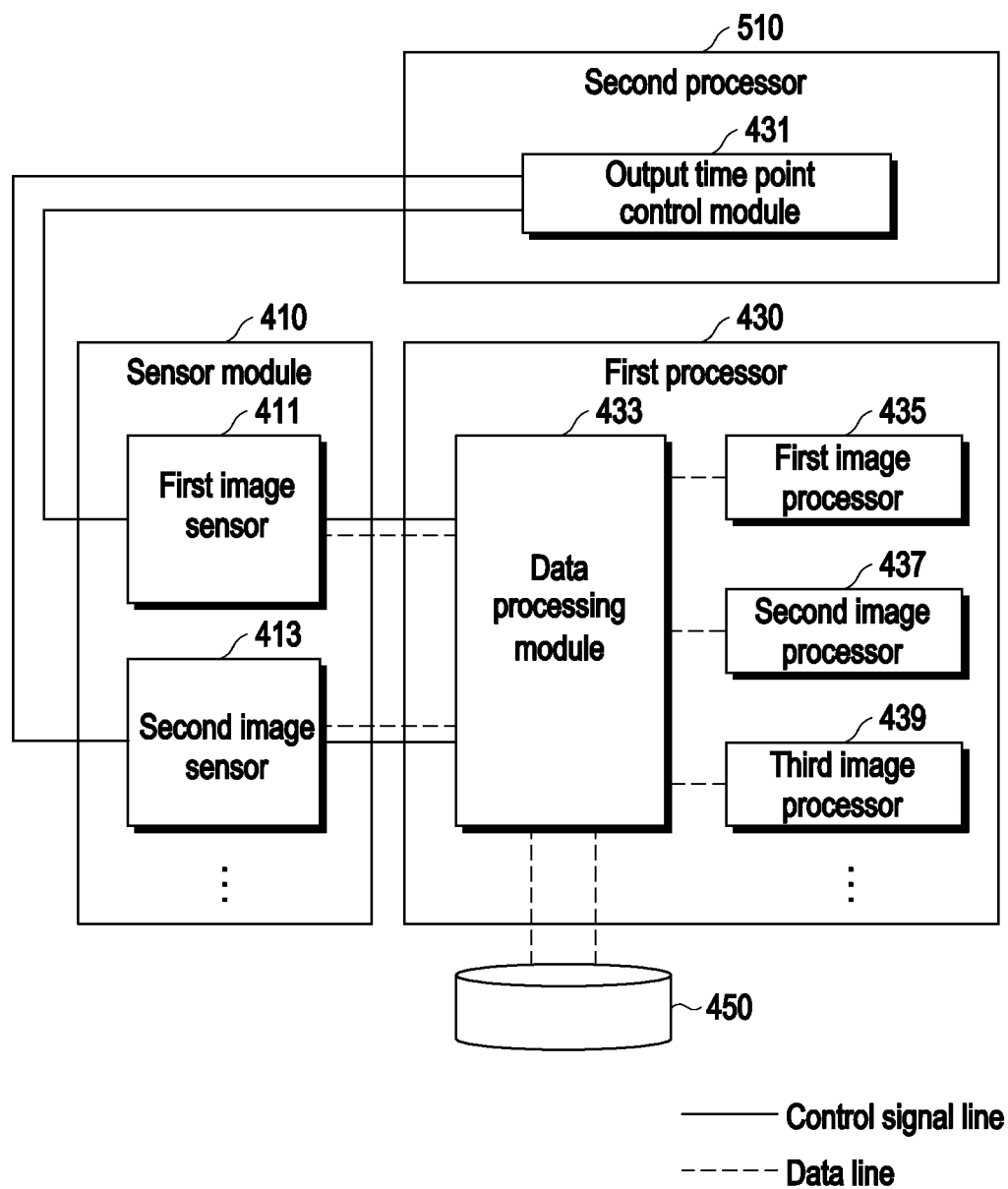
FIG. 5B illustrates another example of the configuration of an electronic device according to various embodiments.

FIG. 5A illustrates another example of the configuration of the electronic device 101 according to various embodiments. FIG. 5B illustrates another example of the configuration of the electronic device 101 according to various embodiments.

According to various embodiments, as illustrated in FIG. 5A, the output time point control module 431 may be implemented in the sensor module 410 (e.g., a sensor hub or a camera module). Therefore, the sensor module 410 (e.g., the output time point control module 431) may receive, from one image sensor (e.g., the first image sensor 411), a signal indicating a time point at which outputting of frame data ends, and may control, based on the received signal, an output time point of frame data of another image sensor (e.g., the second image sensor 413). Alternatively, without being limited to the description, the output time point control module 431 may be implemented in at least some of the plurality of image sensors (e.g., the first image sensor 411 and the second image sensor 413), and the at least some of the plurality of image sensors (e.g., the first image sensor 411 and the second image sensor 413) may control an output time point of frame data of each of the image sensors. In an example, the output time point control module 431 may be implemented in one image sensor (e.g., the first image sensor 411), and, while outputting of frame data, the one image sensor (e.g., the first image sensor 411) may transfer, to another image sensor (e.g., the second image sensor 413), a signal indicating a time point at which the outputting of the frame data ends. The second image sensor 413, which has received the signal, may output, based on the signal, the frame data from a time point after the time point at which the outputting of the frame data ends.

According to various embodiments, as illustrated in FIG. 5B, the output time point control module 431 may be implemented in a second processor 510 separately provided outside the first processor 430. Therefore, the second processor 510 (e.g., the output time point control module 431) provided outside the first processor 430 may control an output time point of frame data of each of the plurality of image sensors (e.g., the first image sensor 411 and the second image sensor 413).

Hereinafter, for ease of description, various embodiments of operations of the electronic device 101 will be described while using the configuration of the electronic device 101 illustrated in FIG. 4A as one example. Various embodiments of operations of the electronic device 101 described below may also be applied to the configuration of the electronic device 101 in FIGS. 5A and 5B.

Hereinafter, examples of operations of the electronic device 101 according to various embodiments will be described.

According to various embodiments, the electronic device 101 may control a time point at which frame data is output from each of the plurality of image sensors (e.g., the first image sensor 411 and the second image sensor 413), so that time intervals during which the frame data is output from the plurality of image sensors (e.g., the first image sensor 411 and the second image sensor 413) do not overlap each other. Based on pieces of frame data that are acquired from the plurality of image sensors (e.g., the first image sensor 411 and the second image sensor 413) and are associated with the different fields of view, the electronic device 101 may generate preview images having the different fields of view and display the generated preview images.

Figure 6:
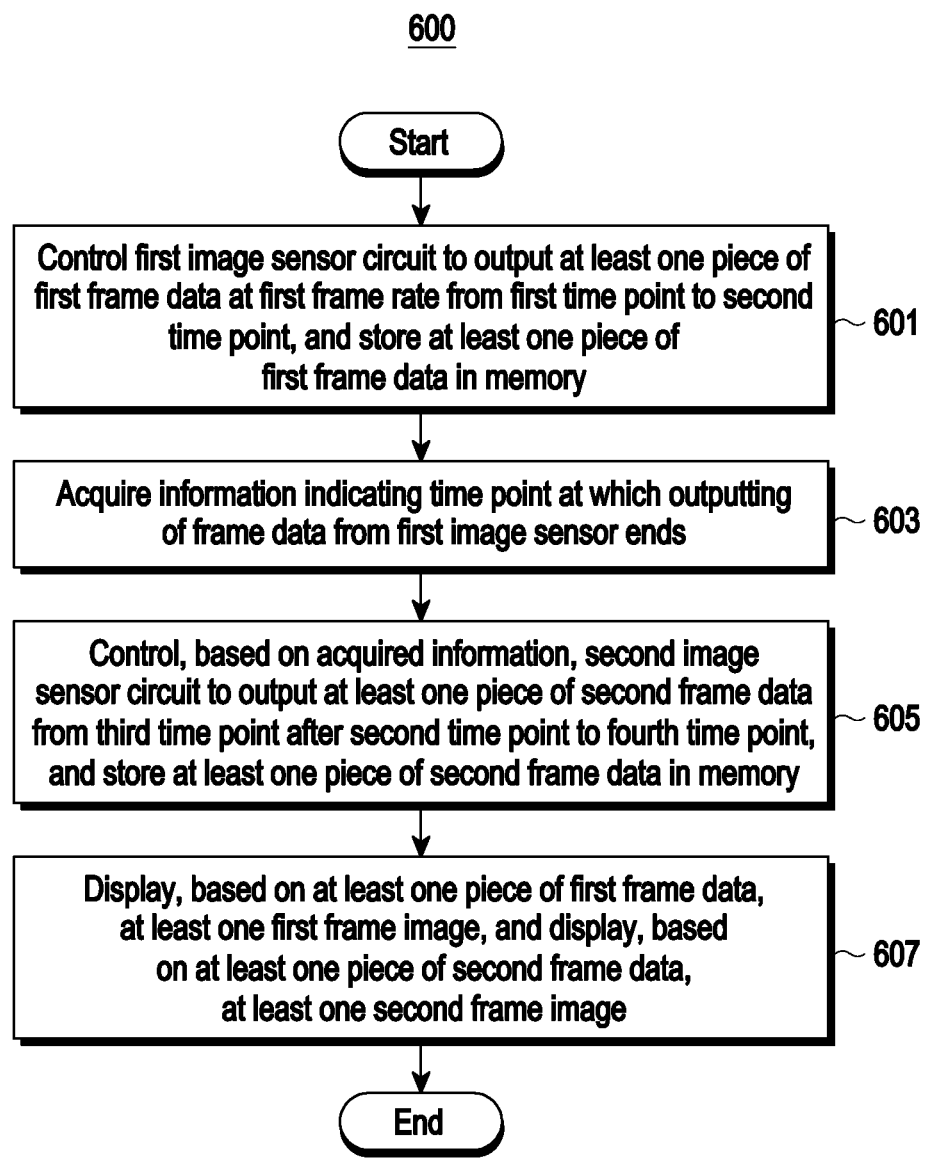
FIG. 6 is a flowchart for describing an example of an operation of an electronic device according to various embodiments.

FIG. 6 is a flowchart 600 for describing an example of an operation of an electronic device 101 according to various embodiments. According to various embodiments, operations illustrated in FIG. 6 may be performed in various orders without being limited to the illustrated order. Further, according to various embodiments, more operations than those illustrated in FIG. 6 may be performed, or one or more operations fewer than the operations illustrated in FIG. 6 may be performed. Hereinafter, FIG. 6 will be described with reference to FIGS. 7, 8, 9A, and 9B.

Figure 7:
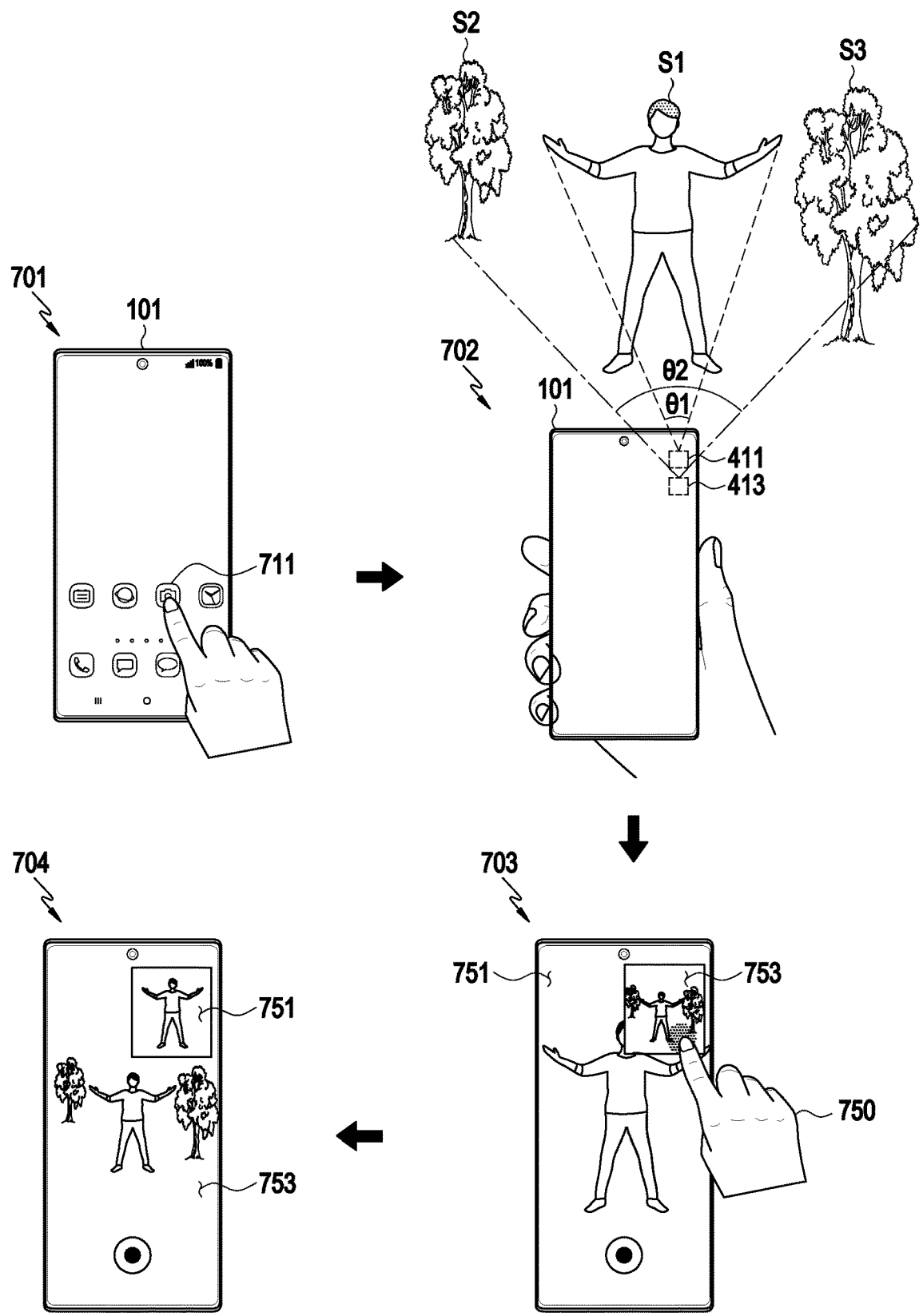
FIG. 7 is a view for describing an example of an capturing image (or imaging, or shooting) operation using a plurality of high-speed image sensors of an electronic device according to various embodiments.
Figure 8:
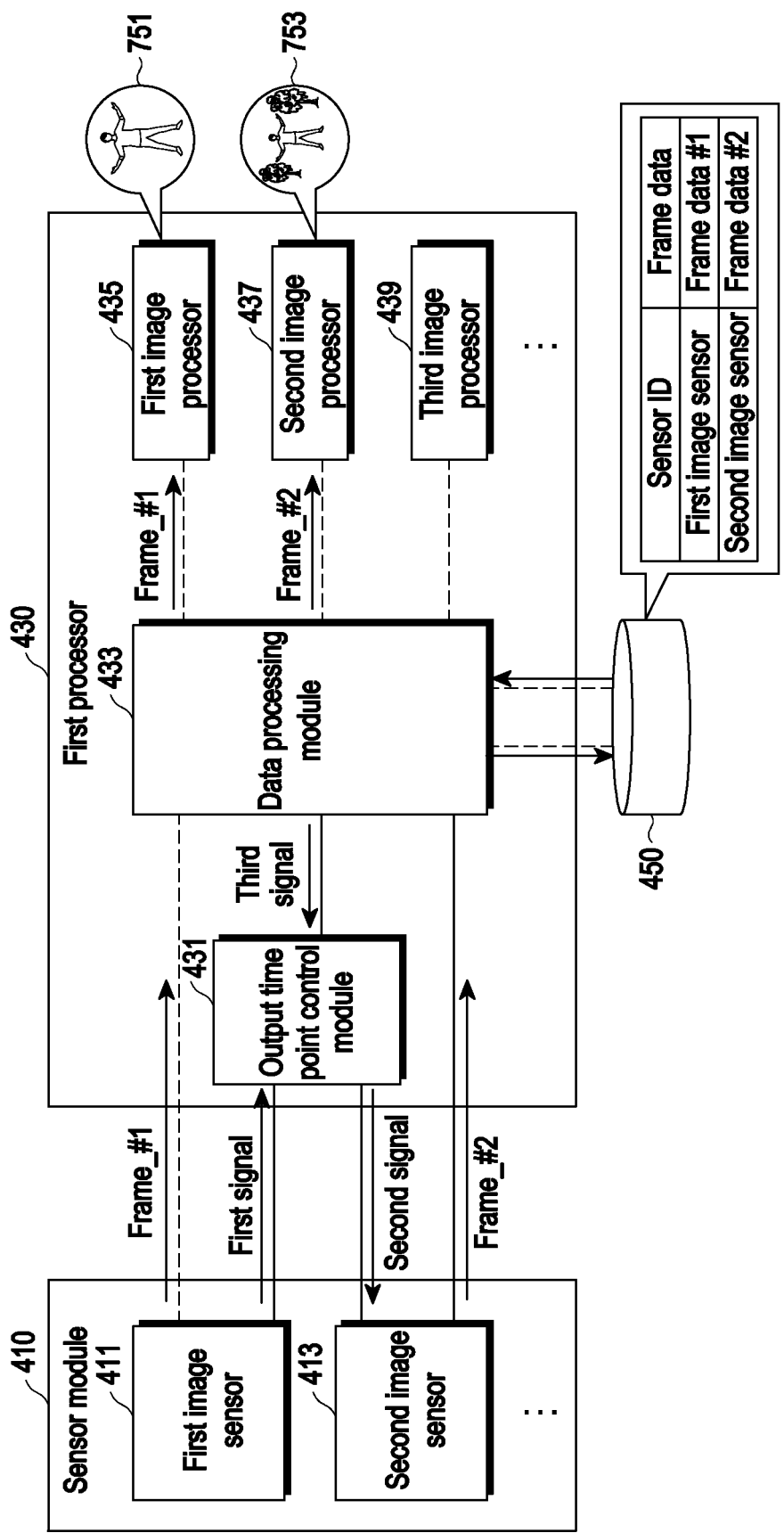
FIG. 8 is a view for describing an example of frame data output operations of a plurality of high-speed image sensors of an electronic device and processing operations of image processors of the electronic device according to various embodiments.
Figure 9A:
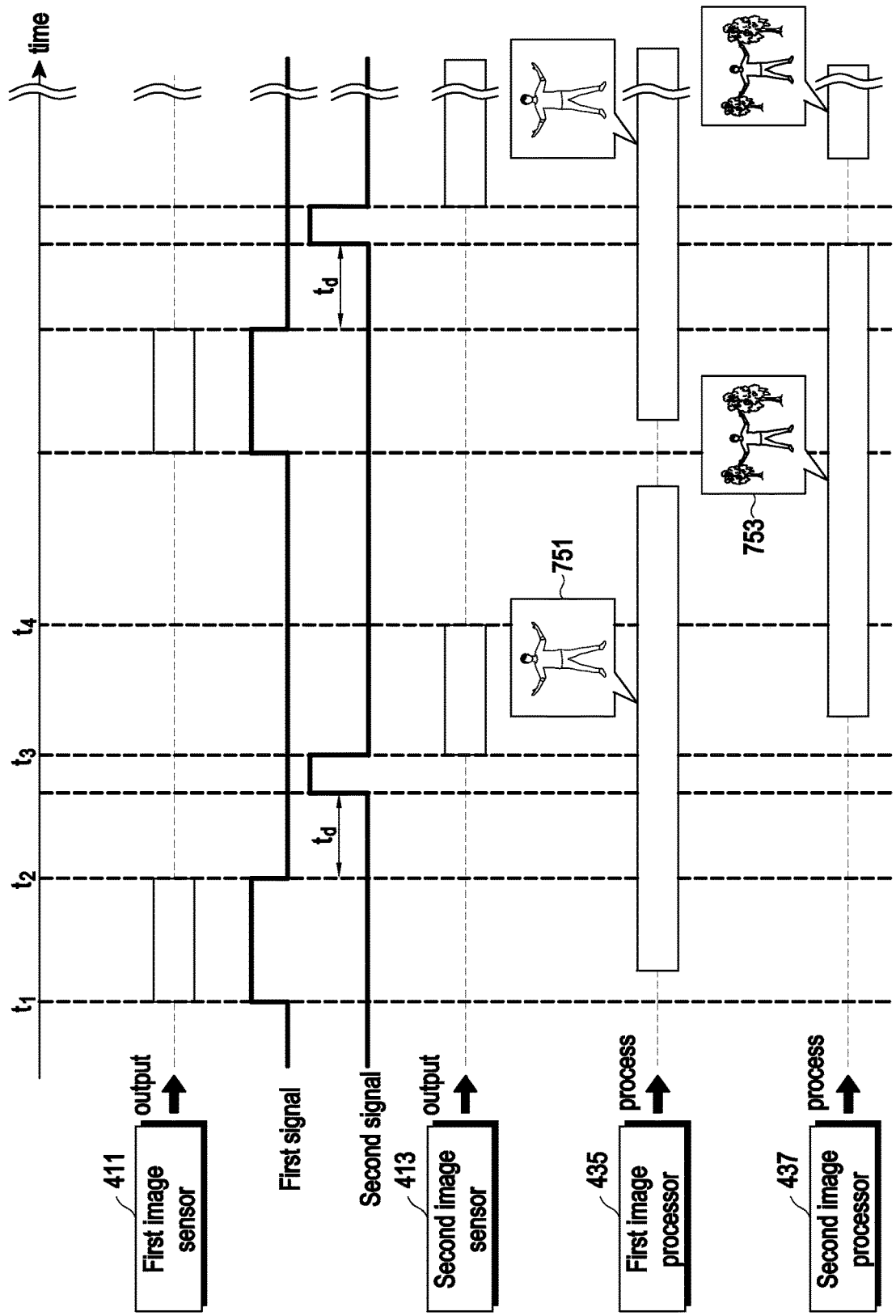
FIG. 9A is a view for describing an example of an operation of controlling an output time point of frame data output from each of a plurality of image sensors of an electronic device according to various embodiments.

FIG. 7 is a view for describing an example of an capturing image (or imaging, or shooting) operation using a plurality of high-speed image sensors of the electronic device 101 according to various embodiments. FIG. 8 is a view for describing an example of frame data output operations of a plurality of high-speed image sensors of the electronic device 101 and processing operations of image processors of the electronic device 101 according to various embodiments. FIG. 9A is a view for describing an example of an operation of controlling an output time point of frame data output from each of a plurality of image sensors (e.g., the first image sensor 411 and the second image sensor 413) of the electronic device 101 according to various embodiments. FIG. 9B is a view for describing another example of an operation of controlling an output time point of frame data output from each of a plurality of image sensors (e.g., the first image sensor 411 and the second image sensor 413) of the electronic device 101 according to various embodiments.

According to various embodiments, in operation 601, the electronic device 101 (e.g., the first processor 430 in FIG. 4A) may control a first image sensor 411 to output at least one piece of first frame data at a first frame rate from a first time point t1 to a second time point t2, and may store the at least one piece of first frame data in the memory 450. For example, as illustrated in reference numeral 701 of FIG. 7, the electronic device 101 may receive an event (e.g., selection of an icon 711 for executing an application) for execution of an application (e.g., a camera application) for driving a plurality of image sensors (e.g., the first image sensor 411 and the second image sensor 413), and as illustrated reference numeral 702 of FIG. 7, may drive, based on execution of the application (e.g., the camera application), some (e.g., the first image sensor 411) of the plurality of image sensors (e.g., the first image sensor 411 and the second image sensor 413). In another example, the electronic device 101 may drive, based on selection of a mode (e.g., a dual super-slow capturing mode) for driving the plurality of image sensors (e.g., the first image sensor 411 and the second image sensor 413) from among a plurality of capturing modes of the camera application, some (e.g., the first image sensor 411) of the plurality of image sensors (e.g., the first image sensor 411 and the second image sensor 413) to capture images of a plurality of subjects (e.g., S1, S2, and S3). Without being limited to the description, the electronic device 101 may drive some (e.g., the first image sensor 411) of the plurality of image sensors (e.g., the first image sensor 411 and the second image sensor 413) based on execution of various applications, other than the camera application, for driving the plurality of image sensors (e.g., the first image sensor 411 and the second image sensor 413). Without being limited to the description, the electronic device 101 may drive some of the plurality of image sensors (e.g., the first image sensor 411 and the second image sensor 413) based on occurrence of various events for driving the plurality of image sensors (e.g., the first image sensor 411 and the second image sensor 413). Hereinafter, a description will be made of an example of an operation of controlling outputting of frame data of an image sensor of the electronic device 101 and processing the output frame data.

According to various embodiments, the first processor 430 may control one (e.g., the first image sensor 411) of the plurality of image sensors (e.g., the first image sensor 411 and the second image sensor 413) to output frame data. For example, the first processor 430 may output a control signal for starting (or causing) performance of a readout operation of the first image sensor 411 illustrated in FIG. 8 to the first image sensor 411. The first image sensor 411 may perform the readout operation based on reception of the control signal, and may output frame data through a data line. The first processor 430 may control a preconfigured image sensor among the plurality of image sensors (e.g., the first image sensor 411 and the second image sensor 413) such that the preconfigured image sensor outputs frame data. For example, the first processor 430 may identify identification numbers of a plurality of data lines connected to the plurality of image sensors (e.g., the first image sensor 411 and the second image sensor 413), and may control a designated image sensor (e.g., the first image sensor 411) connected to a data line having a designated number (e.g., an earliest number or a latest number) among the identification numbers such that the designated image sensor outputs frame data. In another example, the first processor 430 may identify a plurality of fields of view (e.g., θ1 and θ2) associated with the plurality of image sensors (e.g., the first image sensor 411 and the second image sensor 413), and may control a designated image sensor (e.g., the first image sensor 411) having a designated field of view (e.g., the largest field of view or the smallest field of view) among the plurality of identified fields of view such that the designated image sensor outputs frame data.

According to various embodiments, the electronic device 101 may control the first image sensor 411 to output frame data at a frame rate (e.g., 60 fps) corresponding to a preview mode. For example, the electronic device 101 may configure, based on occurrence of an event for driving the image sensors, the mode of the electronic device 101 to be a preview mode. The first processor 430 may transfer, to one (e.g., the first image sensor 411) of the plurality of image sensors, a signal for starting output of the frame data including information indicating that the mode is a preview mode. Thus, the first image sensor 411 may perform a readout operation at a period corresponding to the preview mode to output frame data (e.g., Frame_#1) at a designated frame rate. In an example, the first image sensor 411 may be a high-speed image sensor, and may perform a readout operation at a period of 1/60 seconds for 1/960 seconds to output frame data (e.g., Frame_#1) at 60 fps. The readout operation and frame data output operation of the image sensor are the same as those described with reference to FIGS. 4A and 4B, and thus a redundant description thereof will be omitted.

According to various embodiments, as illustrated in FIG. 8, the first processor 430 (e.g., the data processing module 433) may sequentially store frame data (e.g., Frame_#1) output from the one image sensor (e.g., the first image sensor 411) in the memory 450. As described above, the first processor 430 (e.g., the data processing module 433) may store the frame data in the memory 450 such that the frame data is associated with the image sensor (e.g., the first image sensor 411), which has output the frame data (e.g., Frame_#1), or identification information of the frame data (e.g., the embedded data in FIG. 4B). The operation in which the electronic device 101 stores frame data in the memory 450 is the same as that described with reference to FIGS. 4A and 4B, and thus a redundant description thereof will be omitted.

According to various embodiments, in operation 603, the electronic device 101 may acquire, from the first image sensor 411, information indicating a time point at which outputting of frame data is completed. In operation 605, the electronic device 101 may control, based on the acquired information, the second image sensor 413 to output at least one piece of second frame data from a third time point t3 after the second time point t2 to a fourth time point t4, and may store the at least one piece of second frame data in the memory 450. For example, the electronic device 101 may control the second image sensor 413 to output frame data (e.g., Frame_#2) during a time interval that does not overlap a time interval during which frame data is output from the first image sensor 411. The second image sensor 413 may perform, based on the control, a designated readout operation in a period (e.g., 1/60 seconds) corresponding to the preview mode to output frame data (e.g., Frame_#2) at a designated frame rate (e.g., 60 fps). The electronic device 101 may store, in the memory 450, frame data (e.g., Frame_#2) received from the second image sensor 413 through a data line. As illustrated in FIG. 8, the first processor 430 (e.g., the data processing module 433) may sequentially store frame data output from the one image sensor (e.g., the second image sensor 413) in the memory 450. Like the frame data (e.g., Frame_#1) output from the first image sensor 411, the first processor 430 (e.g., the data processing module 433) may store the frame data (e.g., Frame_#2) output from the second image sensor 413 in the memory 450 such that the frame data is associated with the second image sensor 413 or identification information. Hereinafter, examples of an operation of controlling an output time point of frame data of another image sensor (e.g., the second image sensor 413) will be described based on the signals (e.g., a first signal and a third signal) of the electronic device 101.

According to various embodiments, the electronic device 101 (e.g., the output time point control module 431 of the first processor 430) may identify, based on a signal (e.g., the first signal) fed back from one image sensor (e.g., the first image sensor 411), a time point (e.g., the second time point t2) at which outputting of frame data from the one image sensor (e.g., the first image sensor 411) ends, and may control the second image sensor 413 to output frame data from a time point (e.g., the third time point t3) after the time point (e.g., the second time point t2). For example, as illustrated in FIG. 9A, the first image sensor 411 may output frame data (e.g., Frame_#1) through a data line and simultaneously may output, through a control signal line, a first signal for indicating a time point at which outputting of frame data (e.g., Frame_#1) is completed. The first signal for indicating a time point at which outputting of frame data (e.g., Frame_#1) is completed may be a signal having a specific magnitude (or a magnitude value) during a time interval during which frame data (e.g., Frame_#1) is output (e.g., a time interval from the first time point t1 to the second time point t2 or a readout operation performance time (e.g., 1/60 seconds). In an example, the first signal may be a signal, the magnitude of which is maintained as a high level value (e.g., 1) during a time interval from the first time point t1 to the second time point t2 and is changed to a low level value (e.g., 0) at the time point t2 (e.g., a falling edge). The high level value is a value of a magnitude configured to indicate that there is a signal, information, and/or data, and may be, for example, "1". Further, the low level value is a value configured to indicate that there is no signal, information, and/or data, and may be, for example, "0". The high level value and the low level value are not limited to the described values, and may be preconfigured as various values. The first processor 430 (e.g., the data processing module 433) may measure a value of the received first signal, and may determine, based the measurement of the value of the first signal, that a time point (e.g., the second time point t2) at which a specific value of the first signal is a low level value (e.g., 0) is a time point at which outputting of the frame data (e.g., Frame_#1) ends. Thereafter, as illustrated in FIG. 9A, the output time point control module 431 of the electronic device 101 (e.g., the first processor 430) may transfer, to the second image sensor 413 through a control signal line, a second signal for causing frame data (e.g., Frame_#2) to be output from the third time point t3 after the identified time point (e.g., the second time point t2) at which the outputting of frame data ends. The second signal may be a pulse signal having a specific magnitude (or a magnitude value) (e.g., a high level value) at the third time point t3 that is a time point immediately after a time point (e.g., the second time point t2) at which the first image sensor 411 has ended outputting of frame data (e.g., Frame_#1) or that is a specific time thereafter (e.g., a time point at which a time spacing (td) has elapsed). FIGS. 9A and 9B illustrate that a value of the second signal is maintained during a predetermined time interval. However, the predetermined time interval may correspond to the well-known maintenance time of a value of a pulse signal. The second image sensor 413 may output frame data (e.g., Frame_#2) from a time point of reception of the second signal (e.g., the third time point t3 after the second time point t2) to a fourth time point t4 (e.g., a readout operation performing time (e.g., 1/60 seconds)). As illustrated in FIG. 9A, the electronic device 101 may control the second image sensor 413 to output frame data (e.g., Frame_#2) from a time point (e.g., the third time point t3) after a designated time spacing (td) after a time point (e.g., the second time point t2) at which outputting of frame data of the first image sensor 411 ends. For example, the electronic device 101 may transmit the second signal, which causes the second image sensor 413 to output frame data (e.g., Frame_#2) after the predetermined time spacing (td) elapses after the second time point t2, to the second image sensor 413 through a control signal line. The time spacing (td) may be preconfigured, and may be changed automatically by the electronic device or a user depending on the implementation purpose.

According to various embodiments, as illustrated in FIG. 9B, the electronic device 101 (e.g., the output time point control module 431 of the first processor 430) may identify a specific time point (e.g., a second time point t2) based on information resulting from frame data processing by the first processor 430, and may control the second image sensor 413 to output frame data from a time point (e.g., a third time point t3) after the specific time point (e.g., the second time point t2). For example, the first processor 430 (e.g., the data processing module 433) may store frame data received from the first image sensor 411 in the memory 450 and may identify that storing of the frame data is completed (storage completion), or may identify that reception of the frame data is completed (reception completion). The first processor 430 (e.g., the data processing module 433) may notify the output time point control module 431 of a completion event (e.g., storage completion or reception completion) associated with the frame data. For example, the first processor 430 (e.g., the data processing module 433) may transfer, based on identification of the completion event, a third signal to the output time point control module 431. The output time point control module 431 may transfer, based on reception of the third signal, a second signal for causing frame data to be output from the second time point t2 to the second image sensor 413 through a control signal line.

Further, without being limited to the above description, according to various embodiments, a signal (e.g., the first signal in FIG. 9A) fed back from one image sensor (e.g., the first image sensor 411) to the first processor 430 (e.g., the data processing module 433), a signal (e.g., the second signal in FIGS. 9A and 9B) transferred from the first processor 430 (e.g., the data processing module 433) to an image sensor (e.g., the second image sensor 413), and a signal (e.g., the third signal in FIG. 9B) transferred in the first processor 430 may be implemented as various examples. For example, the signal (e.g., the first signal in FIGS. 9A and 9B) fed back from the one image sensor (e.g., the first image sensor 411) to the first processor 430 (e.g., the data processing module 433) may transfer, to the first processor 430 (e.g., the data processing module 433), various types of signals for indicating the end of outputting of frame data from the one image sensor (or for identifying an output end event). In an example, the first signal is not limited to the signal illustrated in FIGS. 9A and 9B, and may be a pulse signal indicating an output end time point (or output ending). Thus, the first processor 430 (e.g., the data processing module 433) may identify, based on reception of the pulse signal, an output end time point of one image sensor. In another example, the signal (e.g., the second signal in FIGS. 9A and 9B) transferred from the first processor 430 (e.g., the data processing module 433) to an image sensor (e.g., the second image sensor 413) may be implemented as various types of signals for causing the image sensor to start to output frame data. In an example, the second signal is not limited to the signal illustrated in FIGS. 9A and 9B, and may be a signal, the value of which is maintained as a high level value during a predetermined time interval for causing outputting of frame data (e.g., from a time point at which a time spacing (td) has elapsed after the second time point t2 to a third time point t3). Therefore, the image sensor (e.g., the second image sensor 413) may start a readout operation and a frame data output from a time point at which the value of the received signal is changed to a low level value. In another example, like the first signal and/or the second signal described above, the signal (e.g., the third signal) transferred in the first processor 430 (e.g., from the data processing module 433 to the output time point control module 431) may also be implemented as various types of signals for indicating the end of storing (writing) of frame data. Hereinafter, for ease of description, a description will be made using an example in which the first signal is a signal having a high level value during a predetermined time interval, and the second and third signal are pulse signals. However, without being limited to such an example, the first to third signals may be implemented as various types of signals as described above.

According to various embodiments, the electronic device 101 (e.g., the first processor 430) may identify, when the first image sensor 411 starts to output frame data, output end time points of pieces of frame data output for a predetermined period, and may control outputting of frame data of the second image sensor 413 at each output end time point. Alternatively, without being limited to the description, when a time point of outputting of frame data of the second image sensor 413 is firstly determined based on an end time point of outputting of frame data of the first image sensor 411, the electronic device 101 (e.g., the first processor 430) may control the second image sensor 413 to automatically output frame data in a predetermined period (e.g., a preview period (1/60 seconds)).

According to various embodiments, in operation 607, the electronic device 101 may display, based on the at least one piece of first frame data, at least one first frame image, and may display, based on the at least one piece of second frame data, at least one second frame image. For example, the electronic device 101 may acquire frame data (e.g., first frame data (Frame_#1) or second frame data (Frame_#2)) associated with each of the plurality of image sensors (e.g., the first image sensor 411 and the second image sensor 413) stored in the memory 450, and may transfer the acquired frame data to at least some of the plurality of image processors 435, 437, and 439 in order to process the acquired frame data. In an example, the electronic device 101 may transfer first frame data (Frame_#1) associated with the first image sensor 411 to the first image processor 435, and may transfer the second frame data (Frame_#2) associated with the second image sensor 413 to the second image processor 437. Each of the image processors (e.g., the first image processor 435 and the second image processor 437) may process the acquired frame data (e.g., the above-described color model value identification or color processing between pixels, such as interpolation) to generate an image (e.g., a first preview image 751 and a second preview image 753). As illustrated in reference numerals 703 and 704 in FIG. 7, the electronic device 101 (e.g., the first processor 430) may display the first preview image 751 and the second preview image 753 together. The first preview image 751 may be an image of a first field of view associated with the first image sensor 411, and the second preview image 753 may be an image of a second field of view associated with the second image sensor 413.

According to various embodiments, the electronic device 101 may display the first preview image 751 and the second preview image 753 together but visually differently. For example, the electronic device 101 may display one preview image in a larger size than another preview image. In an example, as illustrated in numeral 703 in FIG. 7, the electronic device 101 may display the first preview image 751 while displaying the second preview image 753 on the first preview image 751 in a size smaller than that of the first preview image 751. The second preview image 753 may be displayed on a pop-up window positioned on the first preview image 751. In another example, as illustrated in reference numeral 704 in FIG. 7, the electronic device 101 may also display the second preview image 753 while displaying the first preview image 751 having a smaller size on the second preview image 753. The electronic device 101 may display one preview image, selected from among a plurality of preview images, in a size larger than that of another preview image. For example, as illustrated in reference numerals 703 and 704 in FIG. 7, when the second preview image 753 is selected by a user (e.g., when the second preview image 753 is touched by a user (750)) while displaying the second preview image 753 on the first preview image 751, the electronic device 101 may display the second preview image 753 in a size larger than the first preview image 751. When initially displaying a plurality of preview images (e.g., the first preview image 751 and the second preview image 753), the electronic device 101 may determine that a preview image associated with a designated field of view has been selected from among the plurality of preview images, and may display the preview image, which is determined to have been selected, in a larger size than the other preview images. Subsequently, the electronic device 101 may display another preview image selected by a user input in a larger size. Alternatively, without being limited to the description, the electronic device 101 may perform control such that the selected preview image is highlighted by highlighting the selected preview image (e.g., displaying the contour of a window, which displays the preview image, with a thick line or a changed color). After a preview image is selected from among the plurality of preview images, the electronic device 101 may perform an operation of generating a video with a field of view associated with the selected preview image, and a description thereof will be made later with reference to FIGS. 10 to 14. Without being limited to the description, the electronic device 101 may display the first preview image 751 and the second preview image 753 such that the first preview image 751 and the second preview image 753 visually correspond to (or identical to) each other. For example, the electronic device 101 may display the first preview image 751 and the second preview image 753 in the same size. In another example, regardless of whether the preview image is selected, the electronic device 101 may display the first preview image 751 and the second preview image 753 in the same size.

Alternatively, without being limited to the description, the electronic device 101 may display only one of a plurality of preview images (e.g., the first preview image 751 and the second preview image 753). When an input for displaying another preview image is received while displaying one preview, the electronic device 101 may display the other preview image instead of the one preview image. For example, when a zoom-in input or a zoom-out input (e.g., an input for decreasing or increasing the distance between inputs after multi-touch input) is received while displaying a preview image associated with one field of view, the electronic device 101 may continuously change, according to a zoom operation, the currently displayed preview image associated with the one field of view to a preview image associated with another field of view and may display the same. An operation in which the electronic device 101 displays an image having a field of view corresponding to a zoom-in input or a zoom-out input will be described later with reference to FIGS. 15 to 17. In another example, the electronic device 101 may display an icon for displaying another preview image on one preview image, and, when the icon is selected, may display the other preview image. In another example when a designated movement of the electronic device 101 by a user (e.g., physically shaking the electronic device 101 by a user) is detected, the electronic device 101 may display the other preview image.

Hereinafter, examples of operations of the electronic device 101 according to various embodiments will be described.

According to various embodiments, the electronic device 101 may perform a video recording operation regarding a specific field of view when a designated event occurs while preview images having different fields of view are displayed based on frame data output from a plurality of high-speed image sensors. The video recording operation may include an operation of generating and/or acquiring a video that is slowly reproduced during at least a partial time interval. According to the performance of the video recording operation, the electronic device 101 may increase a frame rate at which an image sensor associated with the specific field of view outputs frame data.

Figure 10:
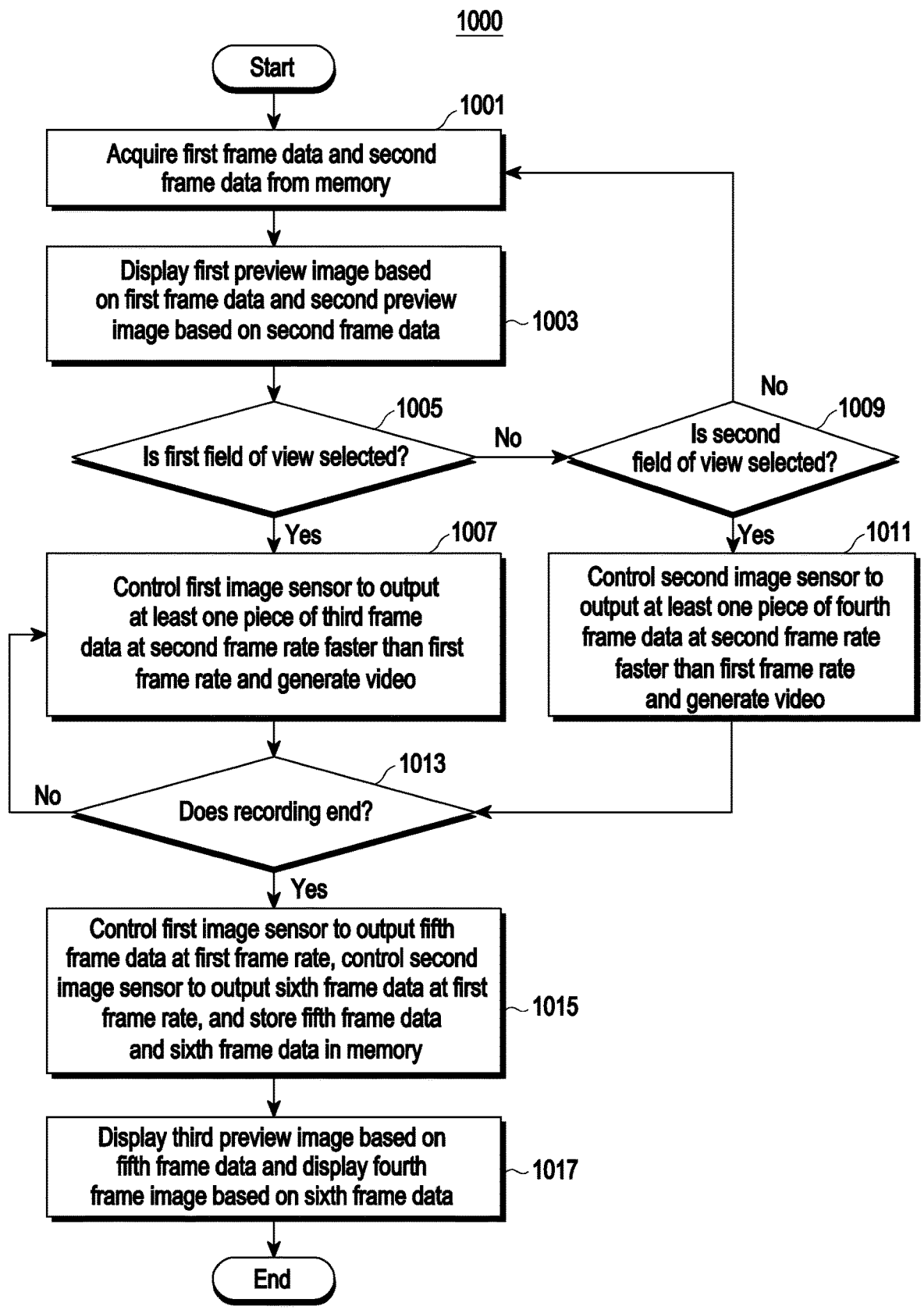
FIG. 10 is a flowchart for describing an example of an operation of an electronic device according to various embodiments.

FIG. 10 is a flowchart 1000 for describing an example of an operation of the electronic device 101 according to various embodiments. According to various embodiments, the operations illustrated in FIG. 10 may be performed in various orders without being limited to the illustrated order. Further, according to various embodiments, more operations than those illustrated in FIG. 10 may be performed, or one or more operations fewer than the operations illustrated in FIG. 6 may be performed. Hereinafter, FIG. 10 will be described with reference to FIGS. 11 to 14.

Figure 11:
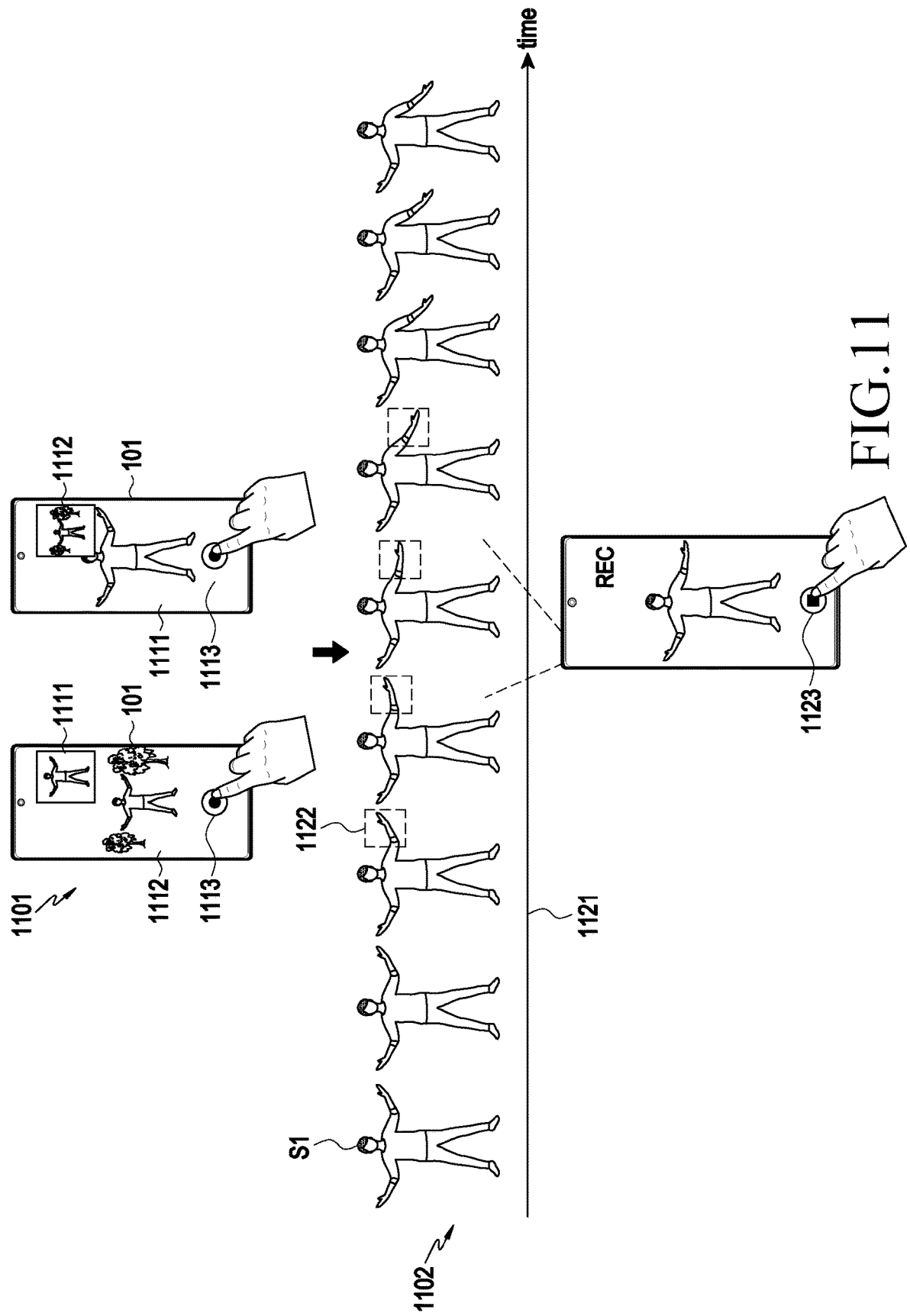
FIG. 11 is a view for describing an example of an capturing image operation using a plurality of high-speed image sensors of an electronic device according to various embodiments.
Figure 12:
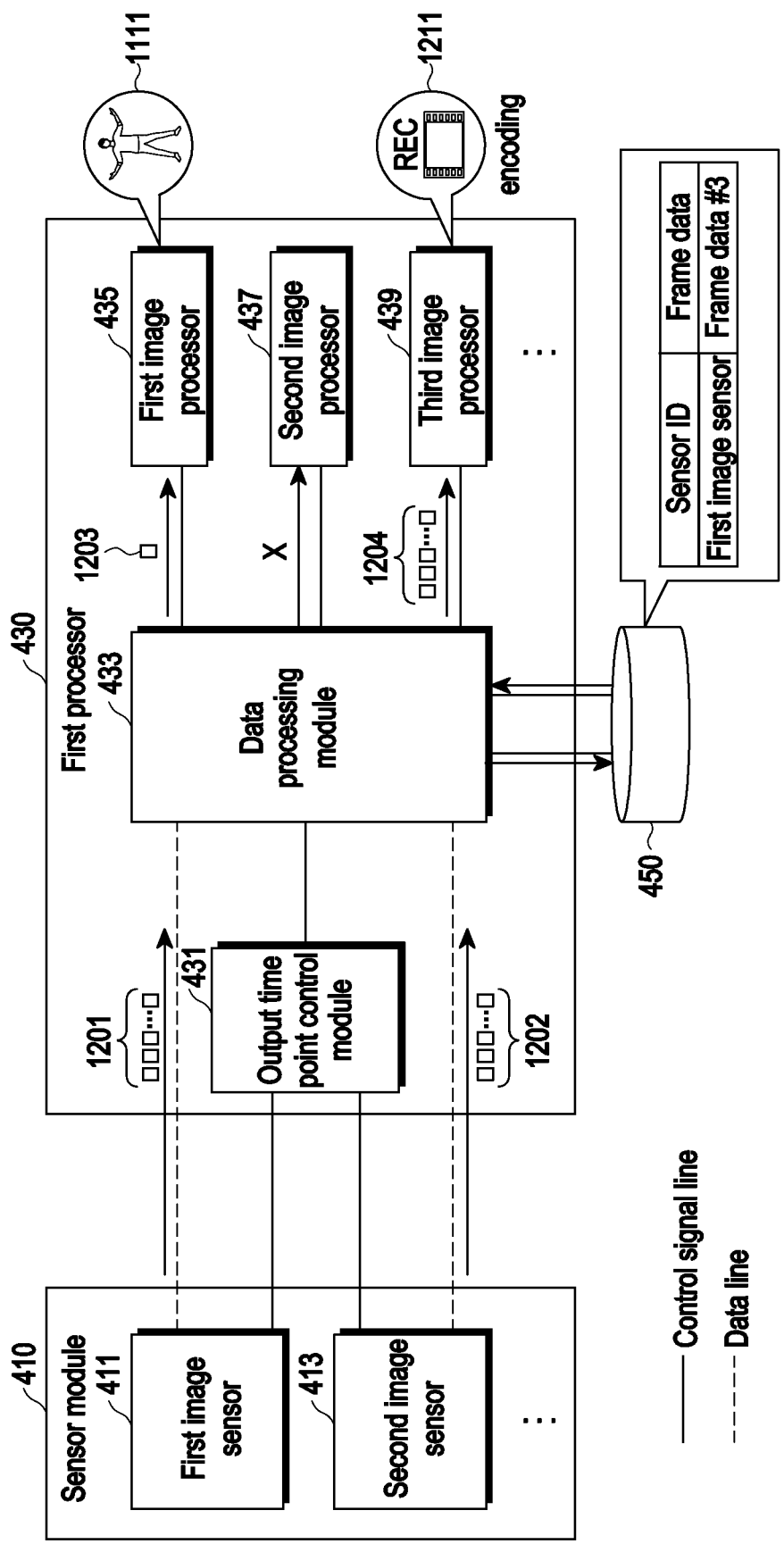
FIG. 12 is a view for describing an example of frame data output operations of a plurality of high-speed image sensors of an electronic device and processing operations of image processors of the electronic device according to various embodiments.
Figure 13:
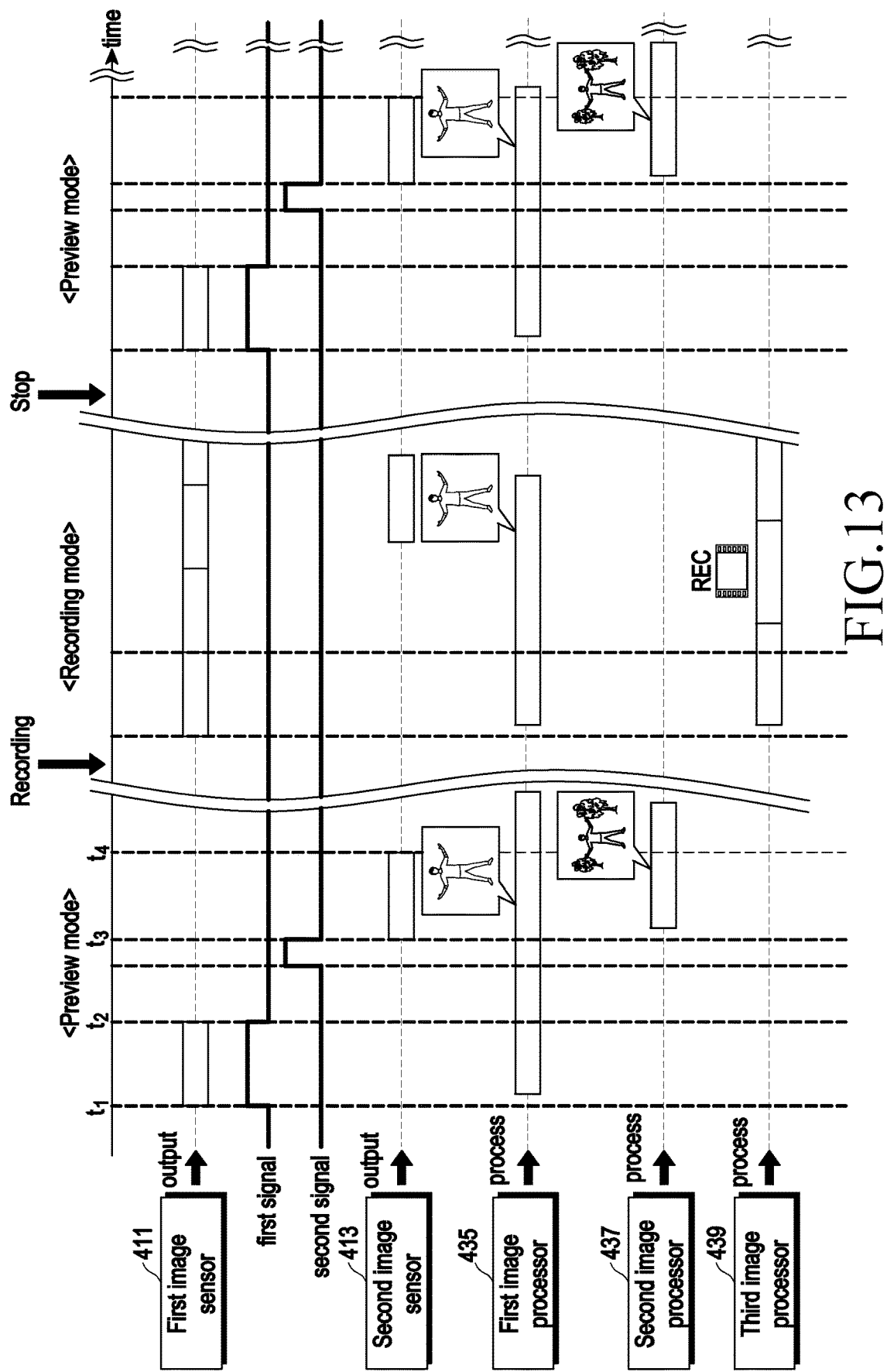
FIG. 13 is a view for describing an example of an operation of controlling a frame data output of each of a plurality of image sensors of an electronic device according to various embodiments.
Figure 14:
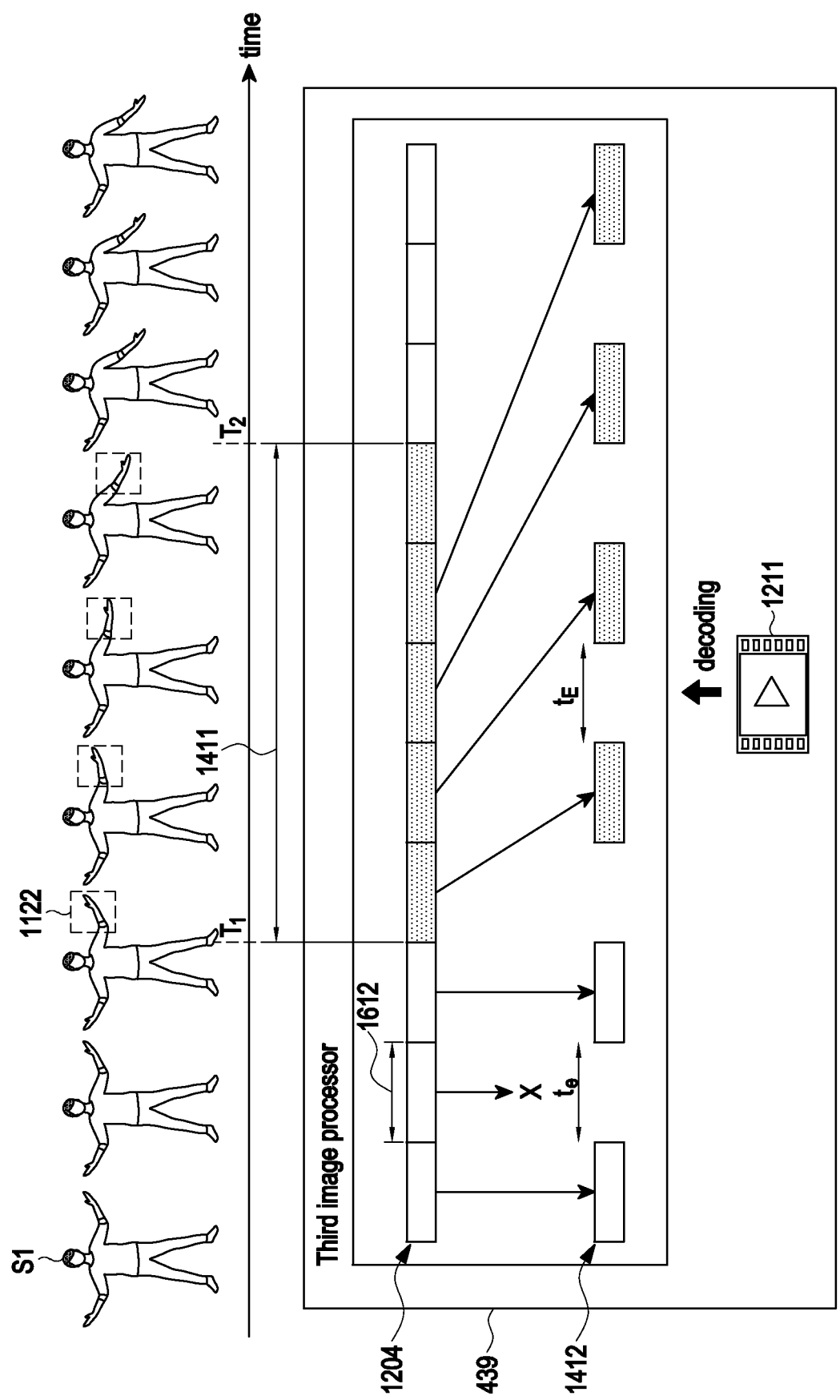
FIG. 14 is a view for describing an example of a slow video recording operation of an electronic device according to various embodiments.

FIG. 11 is a view for describing an example of an capturing operation using a plurality of high-speed image sensors of the electronic device 101 according to various embodiments. FIG. 12 is a view for describing an example of frame data output operations of a plurality of high-speed image sensors of the electronic device 101 and processing operations of image processors of the electronic device according to various embodiments. FIG. 13 is a view for describing an example of an operation of controlling a frame data output of each of a plurality of image sensors (e.g., the first image sensor 411 and the second image sensor 413 in FIG. 4A) of the electronic device 101 according to various embodiments. FIG. 14 is a view for describing an example of a video recording operation of the electronic device 101 according to various embodiments.

According to various embodiments, in operation 1001, the electronic device 101 may acquire a first frame data and a second frame data from the memory 450, and in operation 1003, may display a first preview image based on the first frame data and may display a second preview image based on the second frame data. For example, as in the above-described operations 601 to 607, the electronic device 101 may drive a plurality of image sensors (e.g., the first image sensor 411 and the second image sensor 413) for capturing a plurality of subjects, and may control the first image sensor 411 and the second image sensor 413 to output frame data at a frame rate (e.g., 60 fps) corresponding to a preview mode during time intervals that do not overlap each other. The electronic device 101 may store, in the memory 450, the frame data output from each of the image sensors, and, as illustrated in reference numeral 1101 in FIG. 11, may display, based on a first frame data output from the first image sensor 411, a first preview image 1111 having a first field of view, and may display, based on a second frame data output from the second image sensor 413, a second preview image 1113 of a second field of view. Operations 1001 and 1003 of the electronic device 101 may be performed similarly to the above-described operations 601 to 607, and thus a redundant description thereof will be omitted.

According to various embodiments, in operation 1005, the electronic device 101 may determine whether a first field of view is selected, and, when the first field of view is selected (operation 1005-Yes), in operation 1007, may control the first image sensor 411 to output at least one piece of third frame data at a second frame rate that is faster than the first frame rate from the first image sensor 411, and may generate a video. The electronic device 101 may store the generated video in a memory (e.g., the memory 450 in FIG. 4A). For example, when an event for starting a video generation operation is acquired, the electronic device 101 may start to generate and/or acquire a video of a field of view associated with a currently selected preview image. As described above, the video generation operation may be an operation of generating and/or acquiring a slow video which is slowly reproduced during at least a partial time interval. The electronic device 101 may change, based on the acquisition of the event for starting the video generation operation, the mode of the electronic device 101 from the preview mode to a video recording mode. The electronic device 101 may identify a specific image sensor, and may increase the frame data output speed of the identified image sensor to a speed corresponding to the video recording mode. For example, the electronic device 101 may increase the frame rate of the identified image sensor from a first frame rate (e.g., 60 fps) corresponding to the preview mode to a frame rate (e.g., 960 fps) corresponding to the video recording mode. While some of a plurality of pieces of frame data output from the identified image sensor at the increased frame rate are displayed as a preview image (e.g., reference numeral 1111), the electronic device 101 may acquire and/or generate, based on the plurality of pieces of frame data, a video (slow video) (e.g., reference numeral 1211) which is slowly reproduced during at least a partial time interval. Hereinafter, a description will be made of examples of operations of acquiring an event for starting the video generation operation of the electronic device 101 and controlling the frame rate of an image sensor.

Hereinafter, first, examples of an operation of acquiring an event for starting the video generation operation of the electronic device 101 will be described.

According to various embodiments, as illustrated in reference numeral 1101 in FIG. 11, the electronic device 101 may acquire an event for starting the video generation operation while displaying a selected preview image (e.g., a preview image 1111 of a first field of view or a preview image 1112 of a second field of view). In an example, as illustrated in reference numeral 1101 in FIG. 11, the event for starting the video generation operation may be reception of a user's input which selects an icon (e.g., second preview image 1113), implemented on the selected preview image (e.g., an enlarged and displayed preview image), for starting the video generation operation. In another example, the event for starting the video generation operation may be determining, by the electronic device 101 based on the result of a comparison between frame data, that the movement speed of a subject included in the frame data is equal to or higher than a designated speed. In another example, the event for starting the video generation operation may be detection of a designated gesture of a user (e.g., various types of user inputs, such as tapping, drag, and swipe, or a user' gesture to the electronic device 101, such as shaking the electronic device 101 while holding the same). Thus, as illustrated in reference numeral 1102 in FIG. 11, the electronic device 101 may start the video generation operation to record a video of one subject S1 moving at a speed equal to or higher than a designated speed for a recording maintenance time 1121 (e.g., from a time point of starting of recording to a time point of ending of the recording operation). An event causing the end of the recording may include at least one among an event in which all pieces of frame data are stored (written) in a storage region of a memory (e.g., the memory 450) for storing frame data output from each of the image sensors (e.g., the first image sensor 411), an event in which a recording end icon 1123 is selected, or an event in which the speed of at least a part of the one subject S1 (e.g., a body portion 1122) changes from a speed equal to or higher than a threshold value to a speed lower than the threshold value, as described later.

Hereinafter, a description will be made of examples of an operation of controlling frame data outputting of image sensors (e.g., the first image sensor 411 and the second image sensor 413) in the video recording mode of the electronic device 101.

According to various embodiments, in response to acquisition of the event for starting the video generation operation, the electronic device 101 may identify a specific image sensor, and may increase the frame rate of the identified specific image sensor. For example, the electronic device 101 may increase the frame rate of an image sensor corresponding to a preview image which has been selected (or is being selected) at the time of acquiring the event for starting the video generation operation. In an example, the electronic device 101 may identify an image sensor which has output frame data that is a raw data of a selected preview image. In another example, the electronic device 101 may identify a field of view of the selected preview image, and may identify an image sensor corresponding to the identified field of view. The electronic device 101 may identify an image sensor corresponding to the identified field of view among the plurality of image sensors (e.g., the first image sensor 411 and the second image sensor 413) based on information about a field of view of each of the plurality of image sensors (e.g., the first image sensor 411 and the second image sensor 413) pre-stored in the electronic device 101. The electronic device 101 may increase the frame rate of the identified image sensor (e.g., the first image sensor 411) to a frame rate corresponding to the video recording mode. For example, as illustrated in FIG. 13, in the preview mode, the electronic device 101 may control the first image sensor 411 to output frame data at a first frame rate (e.g., 60 fps) corresponding to the preview mode (e.g., readout speed: 960 fps, readout period: 1/60 seconds), and, in the changed video recording mode, may control the first image sensor 411 to output frame data (e.g., a third frame data (Frame_#3)) at a second frame rate (e.g., 960 fps) corresponding to the video recording mode (e.g., readout speed: 960 fps, readout period: 1/960 seconds). As illustrated above, without being limited to the description, the frame rate corresponding to the video recording mode may be configured as various frame values. As illustrated in FIG. 12, in the video recording mode (e.g., while the video generation operation (or video recording operation) is performed), the electronic device 101 may sequentially store a plurality of pieces of frame data 1201 output from the identified image sensor in the memory 450. As described above, the plurality of pieces of frame data may be stored in the memory 450 so as to be associated with identification information of the identified image sensor.

According to various embodiments, the electronic device 101 may perform control such that frame data (e.g., reference numeral 1202) associated with an image sensor (e.g., the second image sensor 413) different from the identified image sensor is not processed in the video recording mode (e.g., while the video generation operation is performed).

For example, as illustrated in FIG. 13, in the video recording mode, the first processor 430 (e.g., the data processing module 433) may cause the second image sensor 413, which is not selected, to output frame data 1202 at a frame rate (e.g., 60 fps) corresponding to a preview mode, but may not store the frame data output from the second image sensor 413 in the memory 450. The first processor 430 (e.g., the data processing module 433) may identify identification information that is received together with received frame data, and when the identified identification information corresponds to a non-selected image sensor (e.g., the second image sensor 413), may not store (or may discard) the corresponding frame data. In this case, the electronic device 101 may display, while the video generation operation is performed, only a preview image of frame data output from a selected image sensor (e.g., the first image sensor 411) among the plurality of image sensors (e.g., the first image sensor 411 and the second image sensor 413). Further, without being limited to the description, the electronic device 101 may also display a preview image corresponding to the non-selected image sensor, i.e., the second image sensor 413. When a preview image based on the frame data 1202 output from the second image sensor 413 is selected during the video generation operation based on the frame data 1201 output from the first image sensor 411, the electronic device 101 may increase the frame data output speed of the second image sensor 413 to a frame rate (e.g., 960 fps) corresponding to the video recording mode, and may continuously perform the video generation operation based on the frame data output from the second image sensor 413.

In another example, the first processor 430 (e.g., the data processing module 433) may perform control such that the non-selected second image sensor 413 do not output frame data any longer.

Hereinafter, a description will be made of examples of an operation of processing frame data output from a selected image sensor (e.g., the first image sensor 411) of the electronic device 101.

According to various embodiments, as illustrated in FIG. 12, the first processor 430 (e.g., the data processing module 433) may transfer some of a plurality of pieces of frame data (e.g., reference numeral 1201) output from the selected image sensor (e.g., the first image sensor 411) to each of image processors (e.g., the first image processor 435 and the third image processor 439) to process the same (e.g., perform preview image generation or video generation (or video encoding). Hereinafter, examples of operations of the image processors (e.g., the first image processor 435 and the third image processor 439) will be described.

Hereinafter, first, an operation of the third image processor 439 will be described.

According to various embodiments, the third image processor 439 may perform an operation for video generation or an operation for video reproduction. For example, the third image processor 439 may include: an encoder configured to provide an encoding function for video generation, and a decoder configured to provide a decoding function for video reproduction. Without being limited to the description, the decoder of the third image processor 439, which is configured to provide a decoding function, may be implemented in another element (e.g., the first processor 430 or a separate process).

According to various embodiments, the electronic device 101 (e.g., the third image processor 439) may receive some pieces of frame data 1204 for video generation (or video encoding) among the plurality of pieces of frame data 1201, and may generate a video (e.g., the video 1211 in FIG. 12) including the received some pieces of frame data 1204. The third image processor 439 may use codecs (e.g., QuickTime movie (MOV), moving picture experts group-4 (MPEG-4) mp4, audio video interleave (AVI), MPEG, or windows media video (WMV)) to encode the received some pieces of frame data 1204 at a high-speed frame rate (e.g., 960 fps) at which recording has been performed by an image sensor (e.g., the first image sensor 411), thereby generating a video. The codecs are not limited to the description, and well-known codecs may be used. Thus, a description thereof will be omitted.

According to various embodiments, the electronic device 101 may process the plurality of pieces of frame data (e.g., reference numeral 1204 in FIG. 14) included in the generated video, and may acquire, generate, and/or reproduce a slow video 1211 which is relatively slowly reproduced during at least a partial time interval (e.g., from T1 to T2) compared with the remaining time interval. For example, the third image processor 439 may decode the encoded video 1211 by using the codecs (e.g., MOV, mp4, AVI, MPEG, or WMV) to identify a specific time interval (e.g., from T1 to T2) in which the reproduction speed of the image is to be processed to be lower than the reproduction speed in another time interval, and may process frame data (e.g., reference numeral 1411) in the specific time interval and frame data (e.g., reference numeral 1612) in the remaining time interval, among the plurality of pieces of frame data 1204 of the encoded video 1211. The reproduction speed may imply a speed at which a screen of the video 1211 is visually displayed and/or viewed to a user when the video 1211 is reproduced. For example, as illustrated in FIG. 14, the third image processor 439 may identify a specific time interval (e.g., from T1 to T2) during which at least a part 1122 of a subject S1 moves at a speed equal to or higher than a designated speed, and may perform processing such that the reproduction speed of the video 1211 during the identified specific time interval is relatively lower compared with another time interval. For example, the first processor 430 (e.g., the third image processor 439) may identify the specific time interval (e.g., from T1 to T2), during which the at least part 1122 of the subject S1 moves at a speed equal to or higher than a designated speed, by: comparing the plurality of acquired pieces of frame data (e.g., reference numeral 1204) to detect a speed at which the at least part 1122 of the subject S1 included in the plurality of pieces of frame data (e.g., reference numeral 1204) moves, and determining whether the detected speed is equal to or higher than the designated speed. Further, the specific time interval (e.g., from T1 to T2) during which the above-described reproduction speed is processed to be relatively slow may be identified by an image sensor (e.g., the first image sensor 411) itself, and information about the specific time interval (e.g., from T1 to T2) may be transferred from the image sensor to the third image processor 439. Without being limited to the description, the specific time interval (e.g., from T1 to T2) during which the above-described reproduction speed is processed to be relatively slow may be a time interval designated by a user. The third image processor 439 may process the frame rate (e.g., 960 fps) of frame data during the specific time interval (e.g., from T1 to T2) to be decreased to a designated lower frame rate, thereby slowing the reproduction speed during the specific time interval (e.g., from T1 to T2). For example, as illustrated in FIG. 14, when the specific time interval (e.g., from T1 to T2) is identified, the third image processor 439 may insert a designated time spacing (tE) between pieces of frame data 1411 corresponding to the specific time interval (e.g., from T1 to T2) (or may increase the specific time interval by the designated time spacing). In an example, the electronic device 101 may insert a time spacing such that the time spacing (tE) between the pieces of frame data 1411 corresponding to the specific time interval (e.g., from T1 to T2) becomes 1/60 seconds (e.g., may insert the time spacing (tE) such that the video reproduction frame rate during the specific time interval (e.g., from T1 to T2) becomes 60 fps). Due to the insertion of the time spacing (tE), the frame rate (e.g., 960 fps) of the pieces of frame data of the video 1211 during the specific time interval (e.g., from T1 to T2) may decrease to the designated frame rate (e.g., 60 fps). As illustrated in FIG. 14, the electronic device 101 may exclude, at the time of generation of the video 1211, a part 1612 of pieces of frame data of a different time interval other than the specific time interval (e.g., from T1 to T2) among the plurality of pieces of frame data (e.g., reference numeral 1204). For example, the electronic device 101 may process the pieces of frame data of the different time intervals such that a time spacing (e.g., te) corresponding to the time spacing (tE) between the pieces of frame data 1411 of the above-described specific time interval (e.g., from T1 to T2) is present between the pieces of frame data of the other time intervals. In an example, as illustrated in FIG. 14, the electronic device 101 may exclude pieces of frame data (e.g., reference numeral 1612) corresponding to the time spacing (te) among the pieces of frame data of the different time interval and may leave (or maintain) the remaining pieces of frame data (e.g., reference numeral 1412). The time spacing (te) between the remaining pieces of frame data excluding the pieces of frame data may correspond to (or equal to) the time spacing (tE) between the pieces of frame data of the above-described specific time interval during which the video is reproduced at a slow speed. The video decoded by the third image processor 439 may include: the pieces of frame data 1411 of the specific time interval (from T1 to T2), between which the time spacing (tE) is inserted, and the pieces of frame data 1412 of the remaining time interval, from which some pieces of frame data are excluded. When the decoded video is reproduced, the reproduction frame rate (e.g., 60 fps) of the video during the entire time interval may remain constant, wherein the reproduction speed during the specific time interval (e.g., from T1 to T2) is relatively slow compared with other time intervals. The video 1211 may be reproduced based on an application (e.g., a media application) for reproduction of the video 1211. Without being limited to the description, in another example, the third image processor 439 may insert frame data associated with the pieces of frame data in the time spacing (tE) inserted between the pieces of frame data, thereby performing control such that the video 1211 is relatively slowly reproduced during the specific time interval (e.g., from T1 to T2) compared with other time intervals. The third image processor 439 may insert pieces of frame data into the time spacing (tE) such that the frame rate (e.g., 960 fps) of the encoded video is maintained, and may maintain the pieces of frame data of the other time intervals (e.g., may not exclude some of the pieces of frame data in the other time intervals) and maintain the frame rate (e.g., 960 fps). The inserted pieces of frame data may include frame data predicted based on pieces of frame data at time points before and after insertion of the pieces of frame data. In an example, the predicted frame data may be acquired as output data by using frame data at time points before and after insertion of frame data as input data, based on a well-known pre-generated machine learning model or deep learning model. Due to the insertion of the frame data, the existing frame rate (e.g., 960 fps) is maintained in the entire time interval at the time of reproduction of a decoded video, wherein the reproduction speed during the specific time interval (e.g., from T1 to T2) may be slower than that of other time intervals.

Hereinafter, operation of the first image processor 435 will be described.

According to various embodiments, the electronic device 101 (e.g., the first image processor 435) may acquire and/or generate a preview image in a designated period (e.g., a preview period), based on some (e.g., reference numeral 1203) of a plurality of pieces of frame data acquired while the video generation operation is performed. The first processor 430 (e.g., the data processing module 433) may acquire a plurality of pieces of frame data from the memory 450, may select at least some (e.g., reference numeral 1203) from among the acquired pieces of frame data, and may transfer the at least selected some of the pieces of frame data to an image processor (e.g., the first image processor 435) for generating a preview image (e.g., a preview image 1111 of a selected field of view) of the image sensor, among the plurality of image processors (e.g., the first image processor 435, the second image processor 437, and the third image processor 439 in FIG. 4A). For example, the first processor 430 (e.g., the data processing module 433) may select at least some pieces of frame date, which are present in a preview period (e.g., 1/60 seconds), from among a plurality of pieces of frame data, and may transfer the selected at least some pieces of frame data to the first image processor 435 to allow the first image processor 435 to acquire and/or generate a preview image based on the at least some pieces of frame data. Without being limited to the description, the first processor 430 (e.g., the data processing module 433) may transfer all of a plurality of pieces of frame data (e.g., reference numeral 1201) to the first image processor 435, and the first image processor 435 may select at least some of the plurality of pieces of frame data to acquire and/or generate a preview image. The electronic device 101 may display the generated preview image on a display during the video generation operation.

According to various embodiments, when it is determined that the first field of view is not selected (e.g., operation 1005-No), the electronic device 101 may determine, in operation 1009, whether a second field of view is selected. When it is determined that the second field of view is selected, the electronic device 101 may store at least one piece of fourth frame data, which is output from the second image sensor 413 circuit at a second frame rate faster than the first frame rate, in the memory 450 in operation 1011. For example, the electronic device 101 may increase the frame rate of the second image sensor 413 associated with the second field of view to a frame rate (e.g., 960 fps) corresponding to the video recording mode, may store a plurality of pieces of frame data output from the second image sensor 413 in the memory 450, and may perform control such that pieces of frame data output from the remaining image sensors (e.g., the first image sensor 411) are not processed. The electronic device 101 may generate a preview image and the slow view, based on the plurality of pieces of frame data stored in the memory 450. Operations 1009 and 1011 of the electronic device 101 may be performed similarly to the above-described operations 1005 and 1007 of the electronic device 101, and thus a redundant description thereof will be omitted. For example, controlling the first image sensor 411 by the electronic device 101 in operations 1005 and 1007 may be applied to controlling the second image sensor 413 by the electronic device 101 in operations 1009 and 1011.

According to various embodiments, in operation 1013, the electronic device 101 may determine whether recording ends. When it is determined that the recording ends (operation 1013-Yes), in operation 1015, the electronic device 101 may control the first image sensor 411 circuit to output fifth frame data at the first frame rate, may control the second image sensor 413 circuit to output sixth frame data at the first frame rate, and may store the fifth frame data and the sixth frame data in the memory 450. In operation 1017, the electronic device 101 may display a third preview image based on the fifth frame data, and may display a fourth preview image based on the sixth frame data. For example, the electronic device 101 may identify occurrence of an event for ending the video generation operation while performing the video generation operation, and may end the video generation operation based on the occurrence of the event. The event for ending the video generation operation may include at least one among an event in which all pieces of frame data are stored (written) in a storage region of a memory (e.g., the memory 450) for storing frame data output from the image sensors (e.g., the first image sensor 411), an event in which the recording end icon 1123 is selected, or an event in which the speed of at least a part of one subject S1 (e.g., a body portion 1122) changes from a speed equal to or higher than a threshold value to a speed lower than the threshold value, as described later. When the video generation operation ends, the electronic device 101 may reduce the frame rate of one image sensor (e.g., the first image sensor 411) to a frame rate (e.g., 60 fps) corresponding to a preview mode, and may control such that time intervals during which frame data is output from the plurality of image sensors (e.g., the first image sensor 411 and the second image sensor 413) do not overlap each other. The operation of the electronic device 101 in which control is performed such that the time intervals do not overlap each other is the same as that described with reference to FIGS. 6 to 8, 9A, and 9B, and thus a redundant description thereof will be omitted. The electronic device 101 may process frame data output from each of the plurality of image sensors (e.g., the first image sensor 411 and the second image sensor 413) to display preview images (e.g., a preview image of a first field of view and a preview image of a second field of view) again. Subsequently, when an event for the video generation operation is received by a preview image selected while the preview images are displayed, the electronic device 101 may start the video generation operation again.

According to various embodiments, in operation 1013, the electronic device 101 may determine whether recording ends. When it is not determined that the recording ends (operation 1013-No), the electronic device 101 may continuously maintain the recording, and, in operation 1015, may control the first image sensor to output at least one piece of third frame data, and may generate a video.

Hereinafter, examples of operations of the electronic device 101 according to various embodiments will be described.

According to various embodiments, the electronic device 101 may perform a zoom-in operation or a zoom-out operation based on frame data that is associated with different fields of view and is output from a plurality of image sensors.

Figure 15:
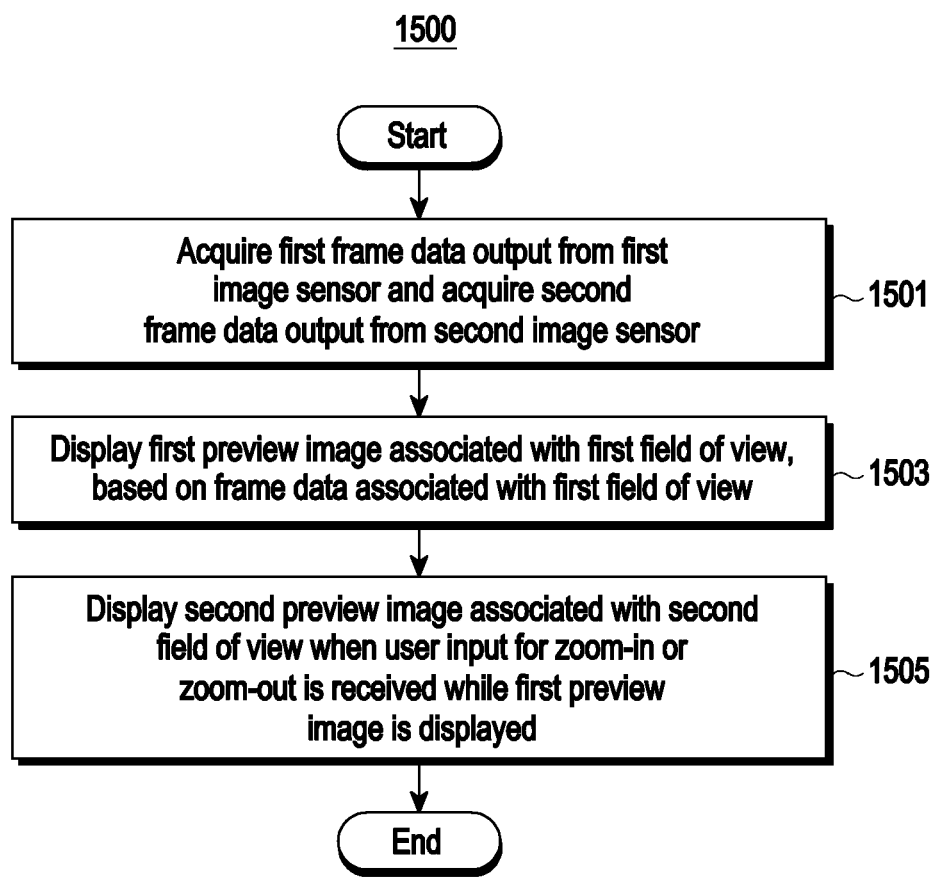
FIG. 15 is a flowchart for describing an example of an operation of an electronic device according to various embodiments.

FIG. 15 is a flowchart 1500 for describing an example of an operation of the electronic device 101 according to various embodiments. According to various embodiments, operations illustrated in FIG. 15 are not limited to the illustrated order, and may be performed in various orders. Further, according to various embodiments, operations more than operations illustrated in FIG. 15 may be performed, or one or more operations fewer than operations illustrated in FIG. 15 may be performed. Hereinafter, FIG. 15 will be described with reference to FIGS. 16 and 17.

Figure 16:
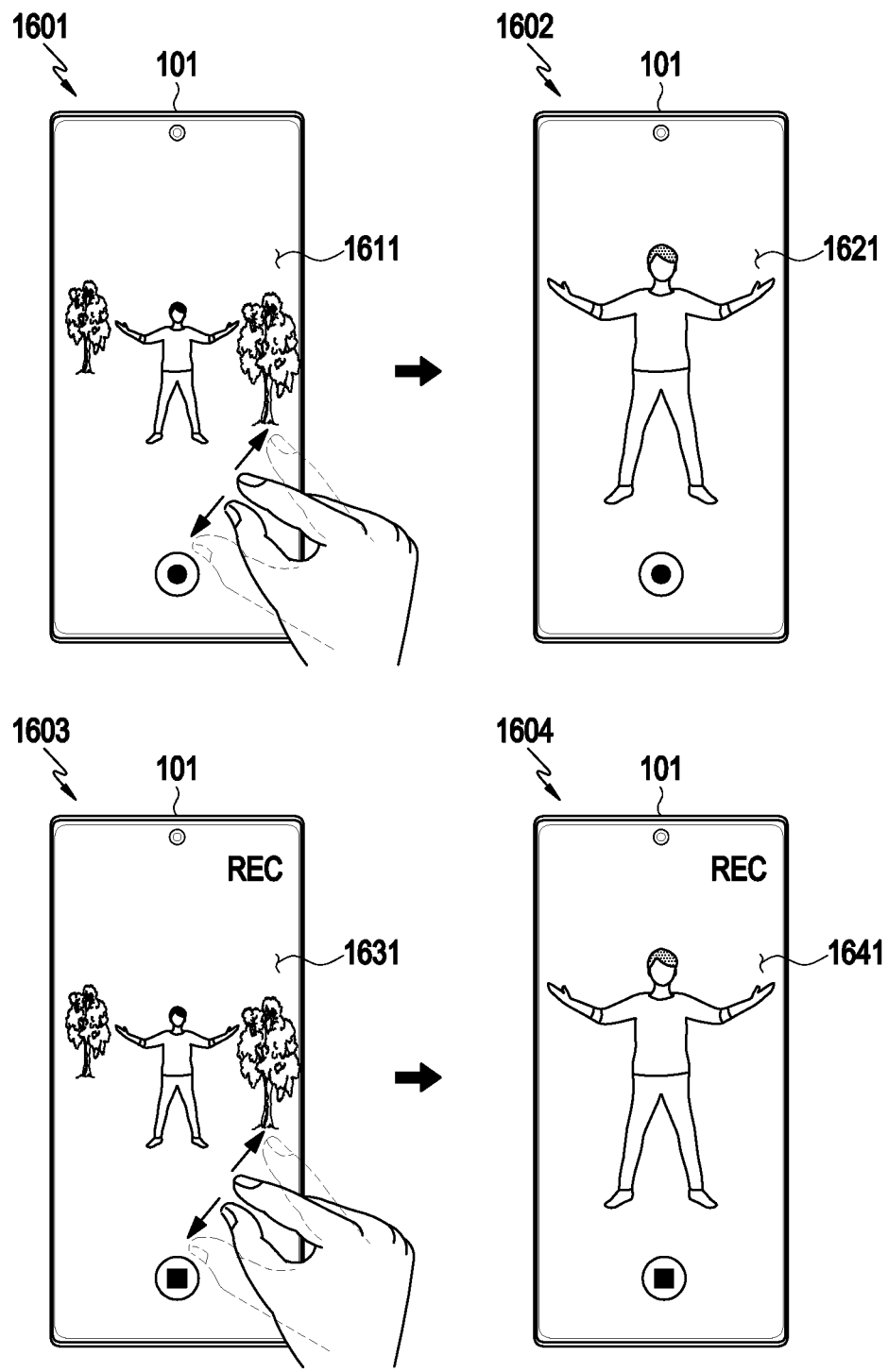
FIG. 16 is a view for describing an example of a zoom-in operation or a zoom-out operation of an electronic device while displaying a preview image (or in a preview mode) according to various embodiments.
Figure 17:
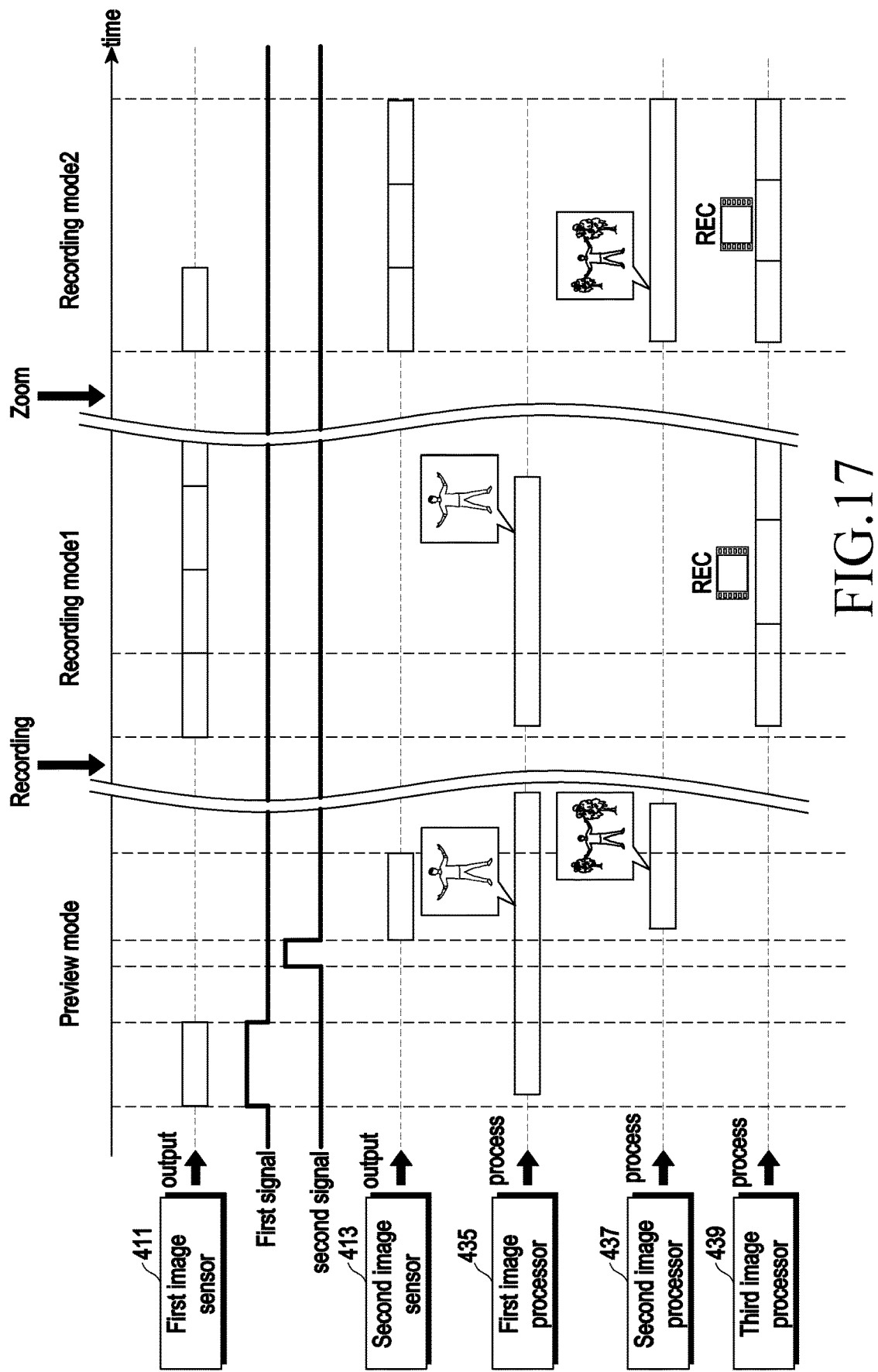
FIG. 17 is a view for describing an example of a zoom-in operation or a zoom-out operation of an electronic device while generating a slow video (or in a video recording mode) according to various embodiments.

FIG. 16 is a view for describing an example of a zoom-in operation or a zoom-out operation of the electronic device 101 while displaying a preview image (or in a preview mode) according to various embodiments. FIG. 17 is a view for describing an example of a zoom-in operation or a zoom-out operation of the electronic device 101 while generating a slow video (or in a video recording mode) according to various embodiments.

According to various embodiments, in operation 1501, the electronic device 101 may acquire at least one piece of first frame data output from a first image sensor (e.g., the first image sensor 411 in FIG. 4A) circuit, and may acquire at least one piece of second frame data output from a second image sensor (e.g., the second image sensor 413 in FIG. 4A) circuit. For example, the electronic device 101 (e.g., the first processor 430 in FIG. 4A) may acquire at least one piece of frame data output from each of a plurality of image sensors (e.g., the first image sensor 411 and the second image sensor 413) for different time intervals in a preview mode or a video recording mode. As described above, frame data output from an unselected image sensor and acquired in the video recording mode may not be stored in a memory. An operation in which the electronic device 101 acquires at least one piece of frame data from each of the plurality of image sensors may be performed similarly to the operation described with reference to FIGS. 6, 7, 8, 9A, and 9B, and thus a redundant description thereof will be omitted.

According to various embodiments, in operation 1503, the electronic device 101 may display a first preview image associated with a first field of view based on frame data associated with the first field of view. In operation 1505, when a user input for zoom-in or zoom-out (hereinafter, referred to as a zoom input) is received while the first preview image is displayed, the electronic device 101 may display the second preview image associated with the second field of view. For example, as illustrated in reference numerals 1601 and 1602 in FIG. 16, the electronic device 101 may perform an operation of displaying preview images of different fields of view according to a zoom input received in the preview mode, or, as illustrated in reference numerals 1603 and 1604 in FIG. 16, may perform an operation of generating videos of different fields of view according to a zoom input received in the video recording mode. As illustrated in FIG. 16, the zoom input may include an input by which the distance between a plurality of touches of a user is increased (or decreased) (a zoom-in input) or an input by which the distance between a plurality of touches is decreased (or increased) (a zoom-out input). However, without being limited to the illustration, the zoom input may include various user inputs (e.g., tapping, swiping, and flickering). Hereinafter, operations that the electronic device 101 performs according to a zoom input received in the preview mode or the video recording mode will be further described.

According to various embodiments, when a zoom input is received in the preview mode, the electronic device 101 may display a preview image of a field of view different from that of a preview image of a currently displayed field of view. For example, as illustrated in reference numerals 1601 and 1602 in FIG. 16, when a zoom-in input is received, the electronic device 101 may display a preview image 1621 having a larger field of view than a preview image 1611 of a currently selected field of view. In an example, the electronic device 101 may display, based on frame data of a first field of view, which is output from the first image sensor 411 among a plurality of image sensors, a preview image of the first field of view. When a zoom-in input (e.g., an input by which the distance between a plurality of touches is decreased) is received while the preview image of the first field of view is displayed, the electronic device 101 may display, instead of the preview of the first field of view, a preview image of a second field of view larger than the first field of view based on frame data output from the second image sensor 413 and associated with the second field of view. The second field of view selected by the zoom-in input may be a field of view which is larger than the first field of view by one level (e.g., is larger than the first field of view by one level among a plurality of fields of view at which capturing can be performed by the electronic device 101). Alternatively, according to the attributes of the zoom-in input (e.g., the increasing or decreasing distance between a plurality of touches), the second field of view may be larger than the first field of view by a plurality of levels. For example, as the changing distance between multi-touch inputs increases, the second field of view larger than the first field of view by a plurality of levels may be continuously determined. The electronic device 101 (e.g., the data processing module) may identify, based on the reception of the zoom-in input, an image processor configured to process frame data of the second image sensor 413 associated with the second field of view larger than the first field of view, among the plurality of image processors (e.g., the first image processor 435, the second image processor 437, and the third image processor 439), and may display a preview image of the second field of view, which is acquired and/or generated by the identified image processor. Alternatively, without being limited to the description, the electronic device 101 may identify, based on the reception of the zoom-in input, frame data which is stored in a memory (e.g., the memory 450 in FIG. 4A), is associated with the second field of view larger than the first field of view, and is output from the second image sensor 413, may transfer the identified frame data to an image processor, and may display a preview image of the second field of view, which is acquired and/or generated by the image processor. In another example, when a zoom-out input is received, the electronic device 101 may display a preview image of a field of view that is smaller than a currently selected field of view. In an example, when a zoom-out input is received, the electronic device 101 may display a preview image of a second field of view smaller than a first field of view based on frame data output from an image sensor associated with the second field of view. The operation in which the electronic device 101 displays a preview image based on the reception of the zoom-out input may be performed similarly to the above-described operation in which the electronic device 101 displays a preview image of a larger field of view based on the reception of the zoom-in input, and thus a redundant description thereof will be omitted.

According to various embodiments, when a zoom input is received in a video recording mode, the electronic device 101 may generate a video of a field of view different from a preselected field of view. For example, as illustrated in reference numerals 1603 and 1604 in FIG. 16, when a zoom-in input (e.g., an input by which the distance between a plurality of touches is decreased) is received, the electronic device 101 may generate a preview video of a field of view larger than a preselected field of view. In an example, as illustrated in FIG. 17, in a first video recording mode (e.g., recording mode 1), the electronic device 101 may generate, based on a plurality of pieces of frame data output from the first image sensor 411, a video of a first field of view while displaying a preview image of the first field of view. The operation of generating a video by the electronic device 101 based on a plurality of pieces of frame data output from an image sensor is similar or identical to the operation described with reference to FIGS. 11 to 15, and thus a redundant description thereof will be omitted. When a zoom-in input is received during the generation of the video of the first field of view, the electronic device 101 may change the mode thereof to a second recording mode (e.g., recording mode 2), and, as illustrated in reference numerals 1603 and 1604 in FIG. 16, may generate a video of a second field of view while displaying a preview image 1641 of the second field of view that is larger than an image 1631 of the first field of view. As illustrated in FIG. 17, while controlling the second image sensor 413 associated with the second field of view selected based on the zoom-in input in the second video recording mode (e.g., recording mode 2) to output a plurality of pieces of frame data at a high speed (e.g., 960 fps), the electronic device 101 may not process a plurality of pieces of frame data output from the first image sensor 411 associated with the first field of view (e.g., may not store the plurality of pieces of frame data in a memory), or may control the first image sensor 411 not to output frame data. As described in relation to the operation of the electronic device 101 based on a zoom input in the preview mode, the second field of view may be a field of view having a higher level than the first field of view, and may be a field of view higher by a plurality of levels according to the attributes of a zoom-in input. In the first video recording mode and the second video recording mode, the terms "first" and "second" are merely described in order to distinguish between operations of generating videos of different fields of view by the electronic device 101, and the first video recording mode and the second video recording mode may be video recording modes identical to each other. In another example, when a zoom-out input (e.g., an input by which the distance between a plurality of touches is increased) is received, the electronic device 101 may generate a preview video of a field of view larger than the preselected field of view. The video generation operation of the electronic device 101 based on the reception of a zoom-out input may be performed similarly to the above-described operation of generating a video of a larger field of view by the electronic device 101 based on the reception of a zoom-in input, and thus a redundant description thereof will be omitted.

Hereinafter, examples of operations of the electronic device 101 according to various embodiments will be described.

According to various embodiments, the electronic device 101 may include at least three image sensors which are identical types of image sensors (e.g., high-speed image sensors or non-high-speed image sensors) or different types of image sensors, and may control the image sensors such that output time points of frame data output therefrom do not overlap each other.

Figure 18:
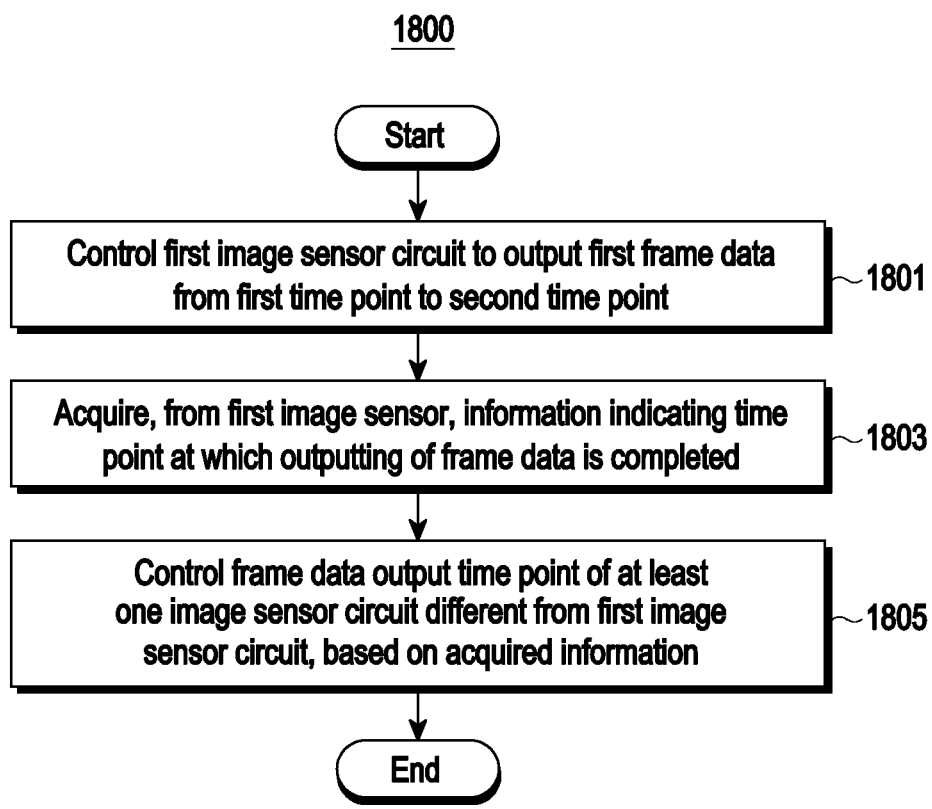
FIG. 18 is a flowchart for describing an example of an operation of an electronic device according to various embodiments.

FIG. 18 is a flowchart 1800 for describing an example of an operation of the electronic device 101 according to various embodiments. According to various embodiments, operations illustrated in FIG. 18 may be performed in various orders without being limited to the illustrated order. Further, according to various embodiments, operations more than the operations illustrated in FIG. 18 may be performed, or one or more operations fewer than the operations illustrated in FIG. 18 may also be performed. Hereinafter, FIG. 18 will be described with reference to FIG. 19.

Figure 19:
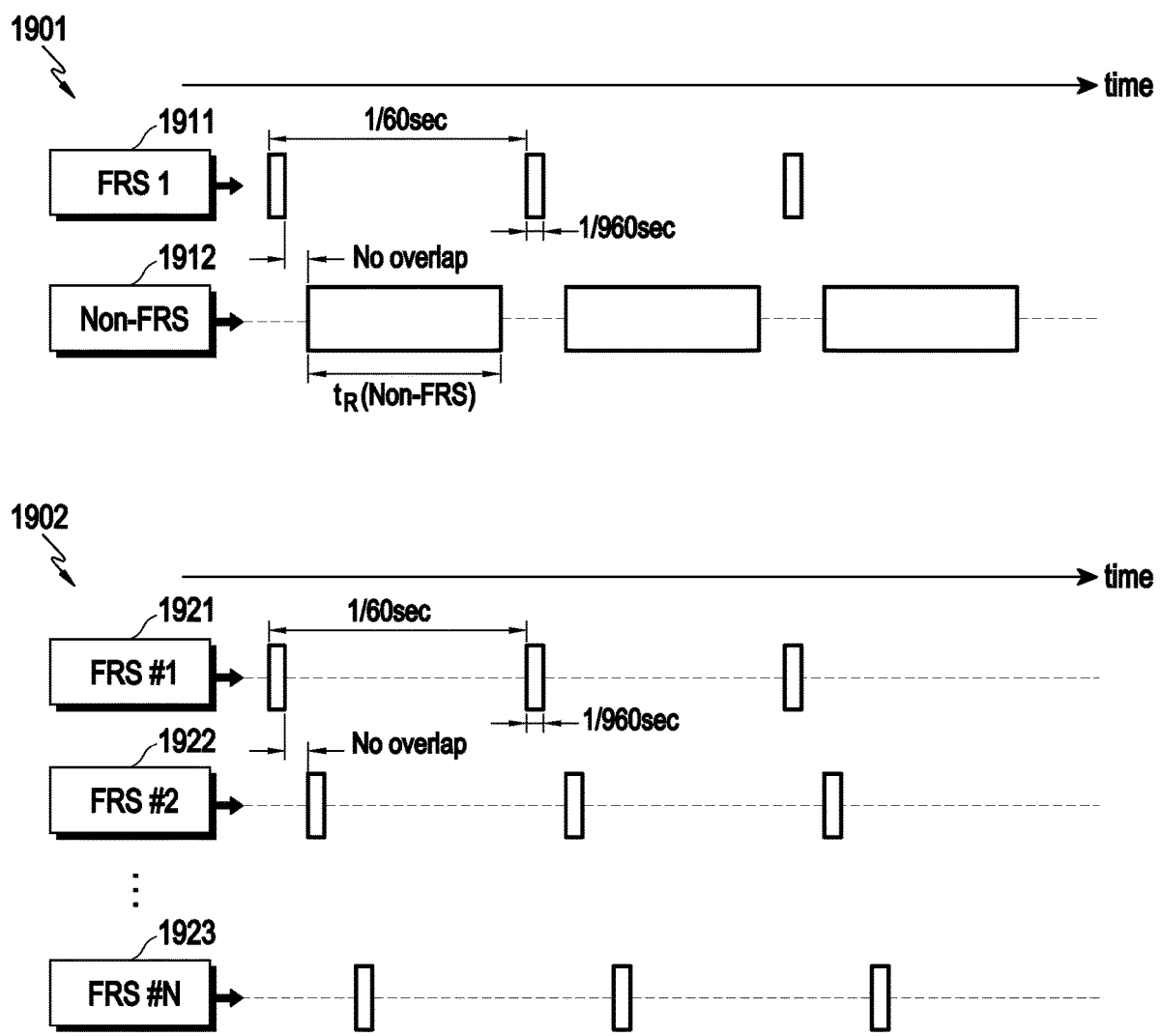
FIG. 19 is a view for describing examples of an operation of controlling an output time point of frame data output from each of a plurality of image sensors of an electronic device according to various embodiments.

FIG. 19 is a view for describing examples of an operation of controlling an output time point of frame data output from each of a plurality of image sensors of the electronic device 101 according to various embodiments.

According to various embodiments, in operation 1801, the electronic device 101 may control a first image sensor circuit to output first frame data from a first time point to a second time point, and in operation 1803, may acquire, from the first image sensor, information indicating a time point at which outputting of the frame data is completed. For example, the electronic device 101 may include a plurality of image sensors, and may control one of the plurality of image sensors to output frame data. The electronic device 101 may acquire, from the one image sensor, information indicating a time point at which outputting of the frame data is completed. The plurality of image sensors may be at least three identical types of image sensors (e.g., a high-speed image sensor or a non-high-speed image sensor). Alternatively, the plurality of image sensors may include different types of image sensors. For example, some of the plurality of image sensors may be high-speed image sensors, and the remaining image sensors thereof may be non-high-speed sensors. Operations 1801 and 1803 of the electronic device 101 may be performed similarly to the above-described operations 601 and 603 of the electronic device 101, and thus a redundant description thereof will be omitted.

According to various embodiments, in operation 1805, the electronic device 101 may control, based on the acquired information, an output time point of frame data that is output from at least one image sensor circuit different from the first image sensor circuit. For example, as illustrated in reference numeral 1901 in FIG. 19, the electronic device 101 may perform control such that time intervals during which frame data is output from different types of image sensors 1911 and 1912) (e.g., a high-speed image sensor and a non-high-speed image sensor) do not overlap each other. For example, as illustrated in reference numeral 1902 in FIG. 19, the electronic device 101 may control such that time interval during which frame data is output from at least three identical types of image sensors 1921, 1922, and 1923 (e.g., high-speed image sensors) do not overlap each other. The operation 1805 of the electronic device 101 may be performed similarly to the above-described operation 605 of the electronic device 101, and thus a redundant description thereof will be omitted.

According to various embodiments, there may be provided the electronic device 101 including a memory (e.g., reference numeral 450 in FIGS. 4A and 4B), a first image sensor circuit (e.g., reference numeral 411 in FIGS. 4A and 4B), a second image sensor circuit (e.g., reference numeral 413 in FIGS. 4A and 4B), and at least one processor (e.g., reference numeral 430 in FIGS. 4A and 4B) operatively connected to the first image sensor circuit (e.g., reference numeral 411 in FIGS. 4A and 4B) and the second image sensor circuit (e.g., reference numeral 413 in FIGS. 4A and 4B), wherein the at least one processor (e.g., reference numeral 430 in FIGS. 4A and 4B) is configured to control the first image sensor circuit (e.g., reference numeral 411 in FIGS. 4A and 4B) to output first frame data associated with a first field of view at a first frame rate from a first time point to a second time point, and store the first frame data in the memory (e.g., reference numeral 450 in FIGS. 4A and 4B), control the second image sensor circuit (e.g., reference numeral 413 in FIGS. 4A and 4B) to output second frame data associated with a second field of view at the first frame rate from a third time point after the second time point to a fourth time point, and store the second frame data in the memory (e.g., reference numeral 450 in FIGS. 4A and 4B), obtain the stored first frame data and the stored second frame data from the memory (e.g., reference numeral 450 in FIGS. 4A and 4B), display, based on the obtained first frame data, a first preview image associated with the first field of view and display, based on the obtained second frame data, a second preview image associated with the second field of view, and based on reception of an input for selecting the first preview image while displaying the first preview image and the second preview image, control the first image sensor circuit (e.g., reference numeral 411 in FIGS. 4A and 4B) to output at least one piece of third frame data associated with the first field of view at a second frame rate faster than the first frame rate, and based on the at least one piece of third frame data, generate the first video associated with the first field of view.

According to various embodiments, there may be provided the electronic device 101 wherein the at least one processor may be configured to perform, based on reception of the input, refrain from storing at least one piece of fourth frame data output from the second image sensor circuit (e.g., reference numeral 413 in FIGS. 4A and 4B) at the first frame rate in the memory (e.g., reference numeral 450 in FIGS. 4A and 4B).

According to various embodiments, there may be provided the electronic device 101 wherein the at least one processor may be configured to: receive, from the first image sensor circuit (e.g., reference numeral 411 in FIGS. 4A and 4B), a signal indicating the second time point at which the outputting of the first frame data ends, and control, based on the received signal, the second image sensor circuit (e.g., reference numeral 413 in FIGS. 4A and 4B) to output the second frame data from the third time point after the second time point.

According to various embodiments, there may be provided the electronic device 101 wherein the at least one processor may be configured to: identify a value of the signal received from the first image sensor circuit (e.g., reference numeral 411 in FIGS. 4A and 4B), and identify, based on the identification of the value of the signal, the second time point at which the value of the signal changes to a low level value (e.g., 0).

According to various embodiments of the disclosure, there may be provided the electronic device 101 wherein the at least one processor may be configured to control the second image sensor circuit (e.g., reference numeral 413 in FIGS. 4A and 4B) to output the second frame data from the third time point at which a preconfigured time has elapsed after the identified second time point.

According to various embodiments, there may be provided the electronic device 101 wherein the at least one processor may be configured to: control the first image sensor circuit (e.g., reference numeral 411 in FIGS. 4A and 4B) to output at least one piece of frame data at a preconfigured period after the identified first time point, and control frame data output of the second image sensor circuit (e.g., reference numeral 413 in FIGS. 4A and 4B) at each of at least one output end time point of the at least one piece of frame data of the first image sensor circuit (e.g., reference numeral 411 in FIGS. 4A and 4B).

According to various embodiments, there may be provided the electronic device 101 wherein the at least one processor may be configured to: store the first frame data in the memory (e.g., reference numeral 450 in FIGS. 4A and 4B) such that the first frame data is associated with the first identification information, and store the second frame data in the memory (e.g., reference numeral 450 in FIGS. 4A and 4B) such that the second frame data is associated with the second identification information.

According to various embodiments, there may be provided the electronic device 101 wherein the at least one processor may include a first image processor and a second image processor, and the at least one processor may be configured to cause the first frame data to be processed by the first image processor, based on the first identification information, and display the first preview image, based on the processing by the first image processor, and cause the second frame data to be processed by the second image processor, based on the second identification information, and display the second preview image, based on the processing by the second image processor.

According to various embodiments, there may be provided the electronic device 101 wherein the at least one processor may be configured to: based on the input for selecting the first preview image, display the first preview image in a first size larger than a second size in which the second preview image is displayed; and receive an input for generating the first video while displaying the first preview image in the first size.

According to various embodiments, there may be provided the electronic device 101 wherein the at least one processor may be configured to: obtain the at least one piece of third frame data, detect the speed of at least a part of a subject, based on a result of a comparison of the at least one piece of third frame data, and detect a time interval during which the detected speed is equal to or higher than a designated speed.

According to various embodiments, there may be provided the electronic device 101 wherein the at least one processor may be configured to: extend a time spacing between at least some of the obtained at least one piece of third frame data, corresponding to the time interval, and exclude at least some from the others of the obtained at least one piece of third frame data, and generate the first video including the at least some of the obtained at least one piece of third frame data and the others of the obtained at least one piece of third frame data, from which the at least some are excluded.

According to various embodiments, there may be provided the electronic device 101 wherein the at least one processor may be configured to, when the generation of the first video ends, control the first image sensor circuit (e.g., reference numeral 411 in FIGS. 4A and 4B) to output fifth frame data at the first frame rate during a first time interval from a time point at which the generation of the first video ends, and control the second image sensor circuit to output sixth frame data at the first frame rate during a second time interval.

According to various embodiments, there may be provided the electronic device 101 wherein the at least one processor may be configured to display, based on the first frame data, the first preview image associated with the first field of view, and, when a user input for zoom-in or zoom-out is received while displaying the first preview image, display the second preview image associated with the second field of view.

According to various embodiments, there may be provided an operation method of the electronic device 101, the method including controlling the first image sensor circuit (e.g., reference numeral 411 in FIGS. 4A and 4B) to output first frame data associated with a first field of view at a first frame rate from a first time point to a second time point, and storing the first frame data in the memory (e.g., reference numeral 450 in FIGS. 4A and 4B), controlling the second image sensor circuit (e.g., reference numeral 413 in FIGS. 4A and 4B) to output second frame data associated with a second field of view at the first frame rate from a third time point after the second time point to a fourth time point, and storing the second frame data in the memory (e.g., reference numeral 450 in FIGS. 4A and 4B) after storing the first frame data, obtaining the stored first frame data and the stored second frame data from the memory (e.g., reference numeral 450 in FIGS. 4A and 4B), displaying, based on the obtained first frame data, a first preview image associated with the first field of view and displaying, based on the obtained second frame data, a second preview image associated with the second field of view, and based on reception of an input for selecting the first preview image while displaying the first preview image and the second preview image, controlling the first image sensor circuit (e.g., reference numeral 411 in FIGS. 4A and 4B) to output at least one piece of third frame data associated with the first field of view at a second frame rate faster than the first frame rate, and based on the at least one piece of third frame data generating the first video associated with the first field of view.

According to various embodiments, there may be provided the method further including performing, based on the reception of the input, control so as not to store at least one piece of fourth frame data output from the second image sensor circuit (e.g., reference numeral 413 in FIGS. 4A and 4B) at the first frame rate in the memory (e.g., reference numeral 450 in FIGS. 4A and 4B).

According to various embodiments, there may be provided the method further including: receiving, from the first image sensor circuit (e.g., reference numeral 411 in FIGS. 4A and 4B), a signal indicating the second time point at which outputting of the first frame data ends, and controlling, based on the received signal, the second image sensor circuit (e.g., reference numeral 413 in FIGS. 4A and 4B) to output the second frame data from the third time point after the second time point.

According to various embodiments, there may be provided the method including identifying a value of the signal received from the first image sensor circuit (e.g., reference numeral 411 in FIGS. 4A and 4B), and identifying, based on the identification of the value of the signal, the third time point at which the value of the signal decreases to 0.

According to various embodiments, there may be provided the method further including controlling the second image sensor circuit (e.g., reference numeral 413 in FIGS. 4A and 4B) to output the second frame data from the third time point at which a preconfigured time has elapsed since the identified second time point.

According to various embodiments, there may be provided the method further including controlling the first image sensor circuit (e.g., reference numeral 411 in FIGS. 4A and 4B) to output at least one piece of frame data at a preconfigured period after the identified first time point, and controlling frame data output of the second image sensor circuit (e.g., reference numeral 413 in FIGS. 4A and 4B) at each of at least one output end time point of the at least one piece of frame data of the first image sensor circuit (e.g., reference numeral 411 in FIGS. 4A and 4B).

According to various embodiments, there may be provided the electronic device 101 including a memory (e.g., reference numeral 450 in FIGS. 4A and 4B), a first image sensor circuit (e.g., reference numeral 411 in FIGS. 4A and 4B), a second image sensor circuit (e.g., reference numeral 413 in FIGS. 4A and 4B), and at least one processor operatively connected to the first image sensor circuit (e.g., reference numeral 411 in FIGS. 4A and 4B) and the second image sensor circuit (e.g., reference numeral 413 in FIGS. 4A and 4B), wherein the at least one processor is configured to control the first image sensor circuit (e.g., reference numeral 411 in FIGS. 4A and 4B) to output at least one piece of first frame data at a first frame rate from a first time point to a second time point, acquire, from the first image sensor circuit, a signal indicating a time point at which the outputting of the at least one pieces of first frame data is completed, and control, based on the acquired signal, the second image sensor circuit (e.g., reference numeral 413 in FIGS. 4A and 4B) to output at least one piece of second frame data at the first frame rate from a third time point after the second time point to a fourth time point.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a housing;
   a memory;
   a plurality of image sensor circuits comprising:
      a first image sensor circuit and a second image sensor circuit disposed on one surface of the housing, and
      the plurality of image sensor circuits configured to support capturing image based on a first frame rate and a second frame rate higher than the first frame rate; and
   at least one processor operatively connected to the first image sensor circuit and the second image sensor circuit,
   wherein the at least one processor is configured to:
      control the first image sensor circuit to output first frame data associated with a first field of view at a first frame rate from a first time point to a second time point, obtain the output first frame data, and store the obtained first frame data in the memory,
      obtain a signal indicating completion of the outputting of the first frame data from the first image sensor circuit,
      control, based on the obtained signal, the second image sensor circuit to output second frame data associated with a second field of view at the first frame rate from a third time point after the second time point to a fourth time point, obtain the output second frame data, and store the obtained second frame data in the memory,
      obtain the stored first frame data and the stored second frame data from the memory,
      display, based on the obtained first frame data, a first preview image associated with the first field of view and display, based on the obtained second frame data, a second preview image associated with the second field of view,
      based on reception of an input for selecting the first preview image while displaying the first preview image and the second preview image, control the first image sensor circuit to output at least one piece of third frame data associated with the first field of view at the second frame rate faster than the first frame rate, and based on the at least one piece of third frame data, generate a first video associated with the first field of view.

2. The electronic device of claim 1, wherein the at least one processor is further configured to perform, based on the reception of the input, refrain from storing at least one piece of fourth frame data output from the second image sensor circuit at the first frame rate in the memory.

3. The electronic device of claim 1, wherein the at least one processor is further configured to:
receive, from the first image sensor circuit, a signal indicating the second time point at which the outputting of the first frame data ends, and
control, based on the received signal, the second image sensor circuit to output the second frame data from the third time point after the second time point.

4. The electronic device of claim 3, wherein the at least one processor is further configured to:
identify a value of the signal received from the first image sensor circuit, and
identify, based on the identification of the value of the signal, the second time point at which the value of the signal decreases.

5. The electronic device of claim 4, wherein the at least one processor is further configured to control the second image sensor circuit to output the second frame data from the third time point at which a preconfigured time has elapsed after the identified second time point.

6. The electronic device of claim 5, wherein the at least one processor is further configured to:
control the first image sensor circuit to output at least one piece of frame data at a preconfigured period after the first time point, and
control frame data output of the second image sensor circuit at each of at least one output end time point of the at least one piece of frame data of the first image sensor circuit.

7. The electronic device of claim 1, wherein the at least one processor is further configured to:
store the first frame data in the memory such that the first frame data is associated with first identification information, and
store the second frame data in the memory such that the second frame data is associated with second identification information.

8. The electronic device of claim 7,
wherein the at least one processor includes a first image processor and a second image processor, and
wherein the at least one processor is further configured to:
cause the first frame data to be processed by the first image processor, based on the first identification information, and display the first preview image, based on the processing by the first image processor, and
cause the second frame data to be processed by the second image processor, based on the second identification information, and display the second preview image, based on the processing by the second image processor.

9. The electronic device of claim 8, wherein the at least one processor is further configured to:
based on the input for selecting the first preview image, display the first preview image in a first size larger than a second size in which the second preview image is displayed, and
receive an input for generating the first video while displaying the first preview image in the first size.

10. The electronic device of claim 8, wherein the at least one processor is further configured to:
obtain the at least one piece of third frame data,
detect a speed of at least a part of a subject, based on a result of a comparison of the at least one piece of third frame data, and
detect a time interval during which the detected speed is equal to or higher than a designated speed.

11. The electronic device of claim 10, wherein the at least one processor is further configured to:
extend a time spacing between at least some of the obtained at least one piece of third frame data, corresponding to the time interval, and exclude at least some from others of the obtained at least one piece of third frame data, and
generate the first video comprising the at least some of the at least one piece of third frame data and the others of the at least one piece of third frame data, from which the at least some are excluded.

12. The electronic device of claim 11, wherein the at least one processor is further configured to:
when the generation of the first video ends, control the first image sensor circuit to output fifth frame data at the first frame rate during a first time interval from a time point at which the generation of the first video ends, and
control the second image sensor circuit to output sixth frame data at the first frame rate during a second time interval.

13. The electronic device of claim 1, wherein the at least one processor is further configured to:
display, based on the first frame data, the first preview image associated with the first field of view, and
when a user input for zoom-in or zoom-out is received while displaying the first preview image, display the second preview image associated with the second field of view.

14. An operation method of an electronic device, the method comprising:
controlling a first image sensor circuit of the electronic device to output first frame data associated with a first field of view at a first frame rate from a first time point to a second time point, obtaining the output first frame data, and storing the obtained first frame data in a memory of the electronic device;
obtaining a signal indicating completion of the outputting of the first frame data from the first image sensor circuit;
controlling, based on the obtained signal, a second image sensor circuit of the electronic device to output second frame data associated with a second field of view at the first frame rate from a third time point after the second time point to a fourth time point, obtaining the output second frame data after the storing of the first frame data, and storing the obtained second frame data in the memory;
obtaining the stored first frame data and the stored second frame data from the memory;
displaying, based on the obtained first frame data, a first preview image associated with the first field of view and displaying, based on the obtained second frame data, a second preview image associated with the second field of view;
based on reception of an input for selecting the first preview image while displaying the first preview image and the second preview image, controlling the first image sensor circuit to output at least one piece of third frame data associated with the first field of view at a second frame rate faster than the first frame rate; and based on the at least one piece of third frame data, generating a first video associated with the first field of view.

15. The method of claim 14, further comprising performing, based on the reception of the input, refraining from storing at least one piece of fourth frame data output from the second image sensor circuit at the first frame rate in the memory.

16. The method of claim 14, further comprising:

receiving, from the first image sensor circuit, a signal indicating the second time point at which the outputting of the first frame data ends; and controlling, based on the received signal, the second image sensor circuit to output the second frame data from the third time point after the second time point.

17. The method of claim 16, further comprising:

identifying a value of the signal received from the first image sensor circuit; and identifying, based on the identification of the value of the signal, the second time point at which the value of the signal decreases.

18. The method of claim 16, further comprising:

controlling the second image sensor circuit to output the second frame data from the third time point at which a preconfigured time has elapsed after the identified second time point.

19. The method of claim 18, further comprising:

controlling the first image sensor circuit to output at least one piece of frame data at a preconfigured period after the first time point; and controlling frame data output of the second image sensor circuit at each of at least one output end time point of the at least one piece of frame data of the first image sensor circuit.

20. The method of claim 14, further comprising:

storing the first frame data in the memory such that the first frame data is associated with first identification information; and storing the second frame data in the memory such that the second frame data is associated with second identification information.

* * * * *